United States Patent
Hase et al.

(10) Patent No.: US 10,828,823 B2
(45) Date of Patent: Nov. 10, 2020

(54) LAMINATED FILM FOR DECORATING THREE-DIMENSIONAL MOLDED PRODUCT BY VACUUM FORMING, PRODUCTION METHOD THEREOF, AND METHOD FOR DECORATING THREE-DIMENSIONAL MOLDED PRODUCT

(71) Applicant: NIPPON PAINT AUTOMOTIVE COATINGS CO., LTD., Osaka (JP)

(72) Inventors: Takakazu Hase, Osaka (JP); Masahiro Kitamura, Osaka (JP)

(73) Assignee: NIPPON PAINT AUTOMOTIVE COATINGS CO., LTD., Osaka (JP)

( * ) Notice: Subject to any disclaimer, the term of this patent is extended or adjusted under 35 U.S.C. 154(b) by 370 days.

(21) Appl. No.: 15/550,116

(22) PCT Filed: Feb. 19, 2016

(86) PCT No.: PCT/JP2016/054944
§ 371 (c)(1),
(2) Date: Dec. 22, 2017

(87) PCT Pub. No.: WO2016/136638
PCT Pub. Date: Sep. 1, 2016

(65) Prior Publication Data
US 2018/0029289 A1 Feb. 1, 2018

(30) Foreign Application Priority Data
Feb. 23, 2015 (JP) ................................ 2015-032829

(51) Int. Cl.
*B32B 7/02* (2019.01)
*B29C 63/02* (2006.01)
(Continued)

(52) U.S. Cl.
CPC ............ *B29C 63/02* (2013.01); *B05D 3/0254* (2013.01); *B05D 7/534* (2013.01); *B29C 51/10* (2013.01);
(Continued)

(58) Field of Classification Search
CPC ...... B05D 1/286; B05D 3/0254; B05D 7/534; B05D 7/5723; B29C 2791/006;
(Continued)

(56) References Cited

U.S. PATENT DOCUMENTS

| | | |
|---|---|---|
| 2012/0228809 A1 | 9/2012 | Atake et al. |
| 2014/0322529 A1 | 10/2014 | Tsuda et al. |
| 2016/0204319 A1 | 7/2016 | Swier et al. |

FOREIGN PATENT DOCUMENTS

| | | |
|---|---|---|
| JP | 2007-290389 A | 11/2007 |
| JP | 2008-105415 A | 5/2008 |

(Continued)

OTHER PUBLICATIONS

Machine Translation of Japanese Patent 2014-172278, Date Unknown.*
(Continued)

*Primary Examiner* — Lawrence D Ferguson
(74) *Attorney, Agent, or Firm* — Ladas & Parry, LLP; Malcolm J. MacDonald

(57) ABSTRACT

The present disclosure is to provide a laminated film for decorating a three-dimensional molded product by vacuum forming which has a crack and strain-free uneven design on the clear coating film layer being an outermost layer at the time of use and provide a good design property to a molded product.
A laminated film for decorating a three-dimensional molded product by vacuum forming, having a base material film layer (A), a clear coating film layer (B), and a design layer
(Continued)

(C), wherein at least one face of the base material film layer (A) bordering the clear coating film layer (B) has an uneven design.

20 Claims, 2 Drawing Sheets

(51) Int. Cl.

| | |
|---|---|
| *B29C 51/10* | (2006.01) |
| *B32B 3/30* | (2006.01) |
| *B32B 33/00* | (2006.01) |
| *B44C 1/17* | (2006.01) |
| *B05D 3/02* | (2006.01) |
| *B05D 7/00* | (2006.01) |
| *B29C 59/00* | (2006.01) |
| *B29C 59/04* | (2006.01) |
| *B29C 63/00* | (2006.01) |
| *B29C 65/48* | (2006.01) |
| *B29C 51/14* | (2006.01) |
| *B29K 55/02* | (2006.01) |
| *B05D 1/28* | (2006.01) |
| *B29K 75/00* | (2006.01) |
| *B29L 7/00* | (2006.01) |

(52) U.S. Cl.
CPC ............ *B29C 59/005* (2013.01); *B29C 59/04* (2013.01); *B29C 63/0065* (2013.01); *B29C 65/48* (2013.01); *B32B 3/30* (2013.01); *B32B 33/00* (2013.01); *B44C 1/1704* (2013.01); *B05D 1/286* (2013.01); *B05D 7/5723* (2013.01); *B29C 51/14* (2013.01); *B29C 59/046* (2013.01); *B29C 2791/006* (2013.01); *B29K 2055/02* (2013.01); *B29K 2075/00* (2013.01); *B29L 2007/008* (2013.01)

(58) Field of Classification Search
CPC ....... B29C 51/10; B29C 51/14; B29C 59/005; B29C 59/04; B29C 59/046; B29C 63/0065; B29C 63/02; B29C 65/48; B29K 2055/02; B29K 2075/00; B29L 2007/008; B32B 33/00; B32B 3/30; B44C 1/1704

See application file for complete search history.

(56) References Cited

FOREIGN PATENT DOCUMENTS

| | | | |
|---|---|---|---|
| JP | 2010-82912 A | | 4/2010 |
| JP | 2012-210755 A | | 11/2012 |
| JP | 2013-28065 A | | 2/2013 |
| JP | 2013-67154 A | | 4/2013 |
| JP | 2014-172278 A | * | 9/2014 |
| JP | 2014-172278 A | | 9/2014 |
| JP | 2015-145103 A | | 8/2015 |
| JP | 2015-217517 A | | 12/2015 |
| WO | 2015/174044 A1 | | 11/2015 |

OTHER PUBLICATIONS

TW Office Action, dated Feb. 26, 2019, corresponding to TW Application No. 105105208.
Non-English International Search Report dated May 24, 2016 for Application No. PCT/JP2016/054944 with English translation.
English translation of JP 2014-172278 A.
Espacenet English abstract of JP 2013-28065 A.
English translation of JP 2012-210755 A.
English translation of JP 2015-217517 A.
English translation of JP 2015-145103 A.
English translation of JP 2007-290389 A.
Espacenet English abstract of JP 2008-105415 A.
English translation of JP 2010-82912 A.
English translation of JP 2013-67154 A.

\* cited by examiner

LAMINATED FILM FOR DECORATING THREE-DIMENSIONAL MOLDED PRODUCT BY VACUUM FORMING, PRODUCTION METHOD THEREOF, AND METHOD FOR DECORATING THREE-DIMENSIONAL MOLDED PRODUCT

TECHNICAL FIELD

The present disclosure relates to a laminated film for decorating a three-dimensional molded product by vacuum forming, a production method thereof, and a method for decorating a three-dimensional molded product.

BACKGROUND OF THE DISCLOSURE

A surface decorating is generally done for providing a design property to a molded product which is obtained from a plastic, a metal and other various materials and protecting the surface.

As one of such a decorating method, a film decorating method using a laminated film is known. This method is to decorate a molded product by forming a layer for decorating as film and bonding it on the molded product. Concerning such method, a film composed of a base material film layer, a clear coating film layer, and a design layer is disclosed, and it is disclosed that various curing type coatings are used in the clear coating film layer. Especially, a decorating method comprising forming a clear coating film by an energy ray-curable coating composition and curing it after forming is known.

As for such decorative sheet, it has been investigated that a three-dimensionally design property is provided by forming an uneven design (Patent documents 1 to 3). The decorative sheet of patent document 1 is formed by laminating a matt layer on one side of a base material film, wherein a picture ink layer is laminated on a reverse side of the base material film, and the matt layer and/or the picture ink layer comprising the surface of the base material film are subjected to emboss processing. However, when such decorative sheet having an uneven design directly on the surface thereof is used for injection molding, the uneven design tends to disappear due to heat pressure at the time of premolding and injection molding, and defects such as strain and crack tend to generate on the uneven design.

The emboss decorated injection molded product disclosed in patent document 2 is formed by utilizing a surface-embossed decorative sheet so that the above-mentioned problem may not be perfectly solved.

Patent document 3 discloses a decorative sheet for insert forming formed by laminating at least a coloring layer, a resin layer, and a backer film on a transparent base material film in this order, wherein the sheet was embossed from the coloring layer to the transparent base material film and a thickness of the resin layer is in the range 0.3-2.5 times of the depth of the emboss. That is, in the invention of patent document 3, the above-mentioned problem is solved by providing the uneven design owing to emboss processing inside of the decorative sheet and filling the uneven design with the resin. However, the uneven design is inside of the decorative sheet not on the surface thereof so that a sufficient design property may not be obtained. Further, the outer most surface is a base material film so that it is difficult to give performances such as sufficient surface hardness and scratch resistance.

Patent document 4 discloses a thermal transfer film having a transfer layer formed by laminating a radical polymerizable resin composition layer and a decorative layer in this order on a surface of a base material film having an unevenness on its surface. This thermal transfer film is tightly adhered to a molded product and the transfer layer is thermally transferred by peeling only the base material film to obtain a decorated molded body having an uneven design on the surface. However, the thermal transfer film is suitable for injection forming and it is unexpected to be used for vacuum forming.

PRIOR TECHNICAL DOCUMENT

Patent Document

[Patent Document 1] Japanese Kokai Publication 2007-290389
[Patent Document 2] Japanese Kokai Publication 2008-105415
[Patent Document 3] Japanese Kokai Publication 2010-82912
[Patent Document 4] Japanese Kokai Publication 2013-67154

SUMMARY OF INVENTION

Problem to be Solved by the Invention

Considering the above-mentioned circumstances, the present disclosure is to provide a laminated film for decorating a three-dimensional molded product by vacuum forming which has a crack and strain-free uneven design on the clear coating film layer being an outermost layer at the time of use and provide a good design property to a molded product.

Means for Solving Object

The present disclosure relates to a laminated film for decorating a three-dimensional molded product by vacuum forming, having a base material film layer (A), a clear coating film layer (B), and a design layer (C), wherein at least one face of the base material film layer (A) bordering the clear coating film layer (B) has an uneven design.

The laminated film for decorating a three-dimensional molded product by vacuum forming
preferably has a breaking elongation of 30 to 400% at 40 to 130° C. before being cured.

The clear coating film layer (B) is preferably formed from an active energy ray-curing
type coating composition containing a polyurethane acrylate (B1), a monomer/oligomer (B2) having an unsaturated double bond and a polymerization initiator (B3), and the active energy ray-curing type coating composition contains the (B1) 50 to 99 wt parts, and (B2) 1 to 50 wt
parts relative to total amount of solid matter weight of (B1) and solid matter weight of
(B2) being ((B1)+(B2)) 100 wt parts, and (B3) 0.5 to 20 wt parts relative to total amount of
solid matter weight of (B1) and solid matter weight of (B2) being ((B1)+(B2)) 100 wt parts.

The laminated film for decorating a three-dimensional molded product may be a film prepared by laminating a base material film layer (A), a clear coating film layer (B), and a design layer (C) in this order.

The laminated film for decorating a three-dimensional molded product may further have an adhesion layer (E) on the outer side of the design layer (C).

The adhesion layer (E) is preferably formed by applying or laminating.

The present disclosure relates to a method for producing the laminated film for decorating a three-dimensional molded product by vacuum forming comprising a step (1) of forming a clear coating film layer (B) on a face having an uneven design of a base material film layer (A) having at least one face with an uneven design, and a step (2) of forming a design layer (C).

The method for producing the laminated film for decorating a three-dimensional molded product by vacuum forming preferably further comprises a step of forming an adhesion layer (E) on the design layer (C).

The present disclosure relates to a method for decorating a three-dimensional molded product, which comprises adhering the adhesion layer of the laminated film for decorating a three-dimensional molded product to a three-dimensional molded product under a heating condition.

Effect of the Invention

The laminated film for decorating a three-dimensional molded product by vacuum forming of the present disclosure has a crack and strain-free uneven design, a good strechability applicable to vacuum forming, and superior characteristics in scratch resistance, hardness, and chemical resistance of the surface thereof after being decorated.

DETAILED DESCRIPTION OF PREFERRED EMBODIMENTS

Figure 1:
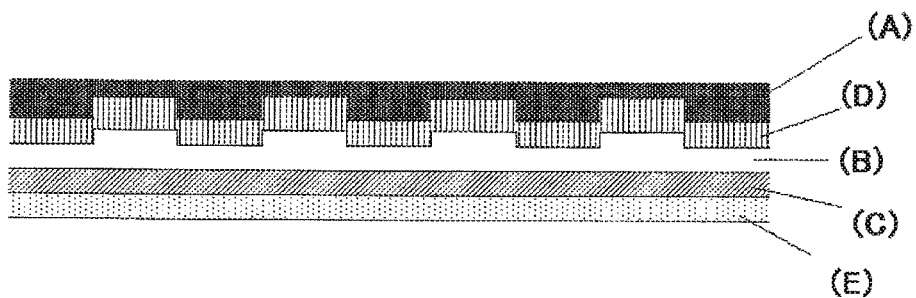
FIG. 1 is a schematic view showing an example of the laminated structure of the laminated film for decorating a three-dimensional molded product by vacuum forming according to the present disclosure.

Hereinafter, the present disclosure will be described in detail.
(Laminated Film for Decorating Three-Dimensional Molded Product by Vacuum Forming)

The laminated film for decorating a three-dimensional molded product by vacuum forming of the present disclosure is a film used for decorative forming of a three-dimensional molded product. That is, by making a film having a design property bond to each of various molded bodies, the molded body is imparted with the design property and is imparted with a surface protecting function.

On this occasion, the laminated film is deformed into a shape along the surface with a three-dimensional shape to be brought into close contact therewith.

The laminated film for decorating a three-dimensional molded product by vacuum forming of the present disclosure comprises a base material film layer (A), a clear coating film layer (B) and a design layer (C). That is, the laminated film comprises a base material film layer (A) being a base material at the time of film production, a design layer (C) for providing the intended design and a clear coating film layer (B) for protecting a surface. Furthermore, the laminated film may comprise a release layer (D), an adhesion layer (E), a protective layer (F), and an ultraviolet ray-absorbing layer (G) according to need. Various laminated structure may be formed by comprising one or more layers of these layers.

In the present disclosure, at least one face of the base material film layer (A) bordering the clear coating film layer (B) has an uneven design. The uneven design is provided on a face of the clear coating film layer (B) bordering the base material film layer (A) by forming the clear coating film layer (B) on such base material film layer (A). That is, the unevenness is provided inside the laminated film for decorating a three-dimensional molded product so that strain and crack are hardly caused. Further, the clear coating film layer (B) becomes the outermost layer by peeling the base material film layer (A), and the face of the clear coating film layer (B) having an uneven design becomes a surface of decorated molded body so that a three dimensional design property due to the uneven design may be sufficiently provided.

Further, the laminated film for decorating a three-dimensional molded product by vacuum forming of the present disclosure can be applied suitably to a vacuum forming. When the laminated film for decorating a three-dimensional molded product is adhered to a molded body by injection forming, strain and crack may be caused on the uneven design because of high temperature treating. On the other hand, such a problem is not caused when the vacuum forming is done because a high temperature treatment is not required, however sufficient strechability is required. When the laminated film for decorating a three-dimensional molded product by vacuum forming of the present disclosure has a breaking elongation of 30 to 400% at 40 to 130° C. before curing, the laminated film can exhibit enough strechability to be applied suitably to a vacuum forming.

In the following, the specific constitution of a laminated film is described by referring to drawings.

The first constitution of a laminated film shown in FIG. 1 is a laminated film prepared by laminating a release layer (D), a clear coating film layer (B), a design layer (C), and an adhesion layer (E) on a base material film layer (A) in this order. In this first constitution of a laminated film, the film with such a constitution is made to bond to a three-dimensional molded product by means of the adhesion layer (E), and after decorative forming, the base material film layer (A) with the release layer (D) is peeled off to perform decorating. On this account, a decorative layer composed of three layers of the clear coating film layer (B), the design layer (C), and the adhesion layer (E) is formed on the surface of the three-dimensional molded product.

Figure 2:
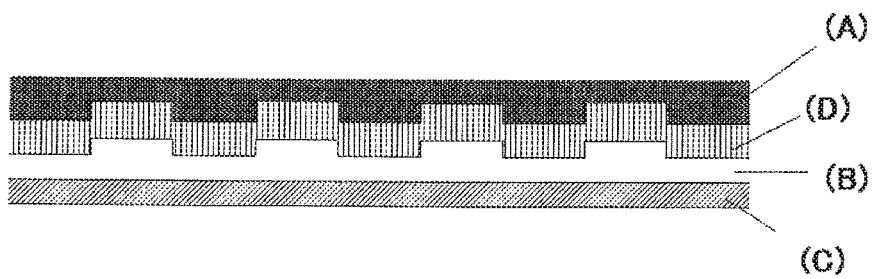
FIG. 2 is a schematic view showing an example of the laminated structure of the laminated film for decorating a three-dimensional molded product by vacuum forming according to the present disclosure.

The second constitution of the laminated film shown in FIG. 2 is a film prepared by laminating a release layer (D), a clear coating film layer (B), and a design layer (C) on the base material film layer (A) in this order. In this case, the design layer (C) is provided a function as an adhesion layer at the same time so that a decorative layer composed of two layers of the clear coating film layer (B) and the design layer (C) is formed on the surface of the three-dimensional molded product.

Figure 3:
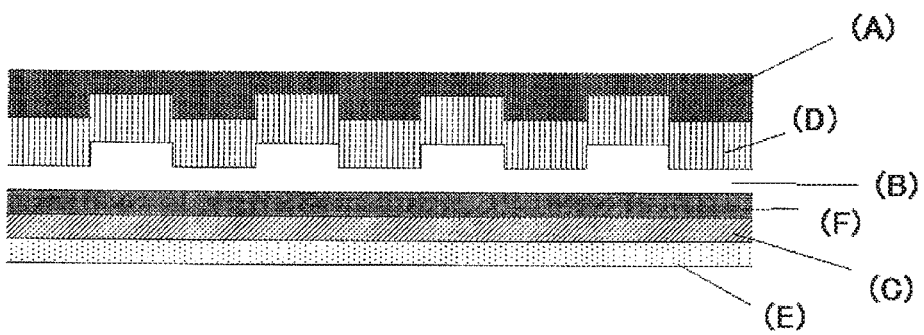
FIG. 3 is a schematic view showing an example of the laminated structure of the laminated film for decorating a three-dimensional molded product by vacuum forming according to the present disclosure.

The third constitution of the laminated film shown in FIG. 3 is a film prepared by laminating a release layer (D), a clear coating film layer (B), a protective layer (F), a design layer (C), and an adhesion layer (E) on a base material film layer (A) in this order. The film with such a constitution is made to bond to a three-dimensional molded product by means of the adhesion layer (E), and after decorative forming, the base material film layer (A) with the release layer (D) is peeled off to perform decorating. On this account, a decorative layer composed of four layers of the clear coating film layer (B), the protective layer (F), the design layer (C), and the adhesion layer (E) is formed on the surface of the three-dimensional molded product.

Figure 4:
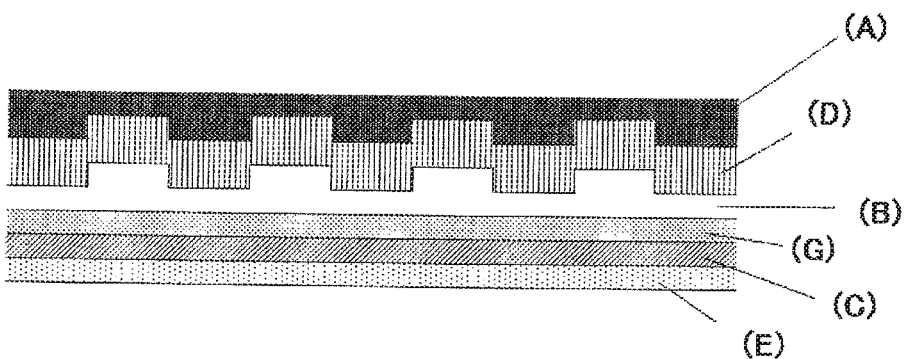
FIG. 4 is a schematic view showing an example of the laminated structure of the laminated film for decorating a three-dimensional molded product by vacuum forming according to the present disclosure.

The fourth constitution of the laminated film shown in FIG. 4 is a film prepared by laminating a release layer (D), a clear coating film layer (B), an ultraviolet ray-absorbing layer (G), a design layer (C), and an adhesion layer (E) on a base material film layer (A) in this order. If the design layer (C) is formed by inkjet printing using an energy ray-curable ink, an ultraviolet ray is blocked by forming an ultraviolet ray-absorbing layer (G) between the design layer (C) and the clear coating film layer (B) so that the clear coating film layer (B) is not irradiated with ultraviolet rays at the time of curing the design layer (C) by an energy ray irradiation. Therefore, the clear coating film layer (B) is not cured at the time of producing the laminated film so that the strechability may be maintained at the time of forming.

Figure 5:
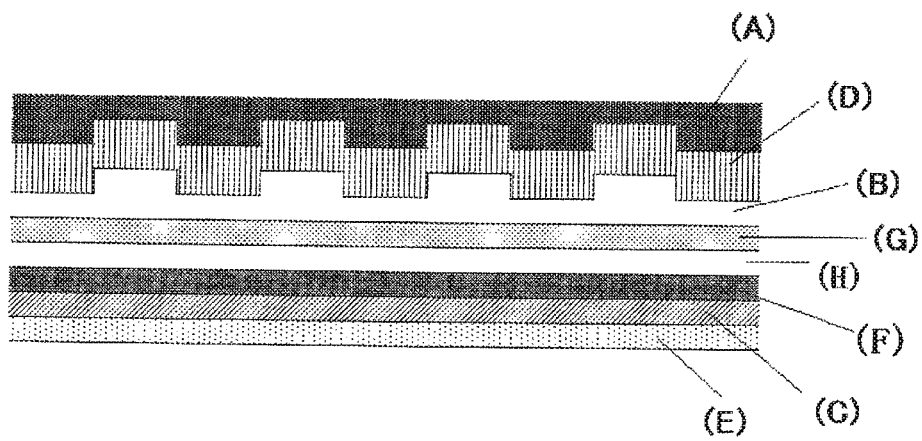
FIG. 5 is a schematic view showing an example of the laminated structure of the laminated film for decorating a three-dimensional molded product by vacuum forming according to the present disclosure.

The fifth constitution of the laminated film shown in FIG. 5 is a film prepared by laminating a release layer (D), a clear coating film layer (B), an ultraviolet ray-absorbing layer (G), an inkjet layer (H) formed by inkjet printing, a protective layer (F), a design layer (C), and an adhesion layer (E) on a base material film layer (A) in this order. In such a constitution, more specific appearance can be obtained by providing an inkjet layer formed by inkjet printing separately from the design layer (C).

Hereinafter, these respective layers constituting the laminated film for decorating a three-dimensional molded product will be sequentially described.

(Base Material Film Layer (A))

The base material film layer (A) is a layer playing a role of a carrier film at the time of producing the laminated film of the present disclosure. That is, at the time of producing the laminated film for decorating a three-dimensional molded product by vacuum forming according to the present disclosure, the base material film layer is a layer used as a base material for forming the respective layers.

A film forming the base material film layer (A) is not particularly limited, and examples thereof include conventionally known films such as a soft vinyl chloride film, a nonoriented polypropylene film, a nonoriented polyester film, a polycarbonate film, an acrylic resin film and a fluorine film. Of these, a film formed from a polyester and/or a polyolefin is preferred, and in particular, a non-stretched polyester film is more preferred from the point of energy saving low-temperature processability. It is preferred that the thickness of the base material film layer (A) be 0.01 to 0.5 mm, and it is more preferred that the thickness thereof be 0.02 to 0.3 mm. When the thickness thereof lies outside this range, the base material film layer is not preferred in the points of a function as the carrier film and an economic aspect at the time of electromagnetic radiation curing.

In the present disclosure, the base material film layer (A) has an uneven design on at least one face thereof. The uneven design is not particularly limited but may be formed by known processing methods such as emboss processing, hairline processing, chemical etching, kneading matte processing, coating matt processing, and phase separation.

In the present disclosure, the uneven design is visually recognized and exhibits visual effects in a design sense by providing the unevenness. Specifically, a leather-like, a wood pattern, or a silky unevenness is formed by passing the film between a metallic roll having various designs on the surface due to emboss processing and a rubber roll. Further, by using a film whose surface is subjected to a hairline processing, a hairline metallic tone design can be represented, and by using a film which is subjected to various matte processing, a metallic tone design showing adjusted matte feeling and a low-gloss print design can be represented.

(Clear Coating Film Layer (B))

The clear coating film layer (B) used in the present disclosure is composed of an energy ray-curable coating film, the specific composition thereof is not particularly limited as long as the physical properties of the laminated film are not impaired, and a known energy ray-curable coating film can be adopted.

The uneven design which is provided on the base material film layer (A) is transferred on the clear coating film layer (B). The transferred uneven design forms a surface layer finally after the base material film layer (A) is peeled and thereby the design property due to the three-dimensional surface design can be obtained. Such uneven design is caused by the energy ray-curable coating film and it is preferred because the hardness and the durability thereof is superior.

The clear coating film layer (B) to be used in the present disclosure is preferably formed from an active energy ray-curing type coating composition. From the above-mentioned viewpoint, the clear coating film layer (B) to be used in the present disclosure is needed to form the uneven shape suitably at the time of forming a coating film by applying, exhibit a superior strechability at the time of molding to a three-dimensional molded product, and keep the uneven shape in such steps.

From the above-mentioned viewpoint, it is preferred that the clear coating film layer (B) be a layer formed from an active energy ray-curing type coating composition containing a polyurethane acrylate (B1), a monomer/oligomer (B2) having an unsaturated double bond and a polymerization initiator (B3). By adopting the layer with such a composition, since the resulting laminated film is easily stretched when used and can also easily cope with vacuum forming, the laminated film satisfactorily follows the three-dimensional shape. Moreover, the resulting laminated film also has an advantage that blocking is hardly generated.

Furthermore, the active energy ray-curing type coating composition contains (B1) in a content lying within the range of 50 to 99 parts by weight and (B2) in a content lying within the range of 1 to 50 part(s) by weight in 100 parts by weight of the total amount ((B1)+(B2)) of the solid content weight of (B1) and the solid content weight of (B2), and (B3) in a content lying within the range of 0.5 to 20 part(s) by weight relative to 100 parts by weight of the total amount ((B1)+(B2)) of the solid content weight of (B1) and the solid content weight of (B2). On this account, the resulting laminated film can have a blocking resistance and deep drawability (stretchability) before curing. Furthermore, the resulting laminated film can have high scratch resistance, surface hardness, chemical resistance and impact resistance after curing.

Hereinafter, (B1) to (B3) will be described in detail.

(Polyurethane Acrylate (B1))

The polyurethane acrylate (B1) is a compound having a urethane bond in its molecule and having a (meth)acrylate group in the molecule. By using this, since the stretchability at the time of performing decorative forming is enhanced and the resulting laminated film can also easily cope with vacuum forming, the laminated film satisfactorily follows the three-dimensional shape.

The polyurethane acrylate (B1) is not particularly limited, and any known polyurethane acrylate can be used. Examples thereof include i) a compound obtained by making a compound having two or more isocyanate groups in its molecule and a compound having one or more hydroxyl group(s) and one or more double bond group(s) in its molecule undergo an equivalent reaction, ii) a compound obtained by making a condensate between a polyol and a monobasic acid and/or a polybasic acid and/or an acid anhydride thereof react with a compound having two or more isocyanate groups in its molecule, and then, further making the reaction product react with a compound having one or more hydroxyl group(s) and one or more double bond group(s) in its molecule, and iii) a compound obtained by making a polyol react with a compound having two or more isocyanate groups in its molecule, and then, further making the reaction product react with a compound having one or more hydroxyl group(s) and one or more double bond group(s) in its molecule, and the like.

With regard to i) to iii) mentioned above, examples of the compound having one or more hydroxyl group(s) and one or more double bond group(s) in its molecule include 2-hydroxy(meth)acrylate, 2-hydroxypropyl (meth)acrylate, 4-hydroxybutyl (meth)acrylate, pentaerythritol triacrylate, dipentaerythritol pentaacrylate, and the like, PLACCEL F(M) A series (trade name, Daicel Corporation) as commercial products, and the like. Moreover, with regard to ii) to iii) mentioned above, examples of the polyhydric alcohol include polyethylene glycol, polycarbonate diol, polytetramethylene glycol, trimethylolpropane, and the like, PLACCEL DIOL series (trade name, Daicel Corporation) and PLACCEL TRIOL series (trade name, Daicel Corporation) as commercial products, and the like.

The polyol is not particularly limited, and known acrylic polyol, polyester polyol, polycarbonate polyol and the like can be used. Moreover, various low molecular weight diols such as ethylene glycol, butanediol, glycerin, pentaerythritol and neopentyl glycol, and the like can also be used as necessary.

It is preferred that the polyol have a polycarbonate diol skeleton in a proportion that the polycarbonate concentration becomes 0.5 to 75 wt % (a proportion relative to the whole amount of the polyurethane acrylate (B1)). By using a polyol having a polycarbonate diol skeleton, the toughness is exhibited, and the resulting laminated film has an advantage that swelling at the time of decorative forming can be prevented and the design appearance can be maintained (a crack can be prevented).

It is more preferred that the proportion of the polycarbonate diol be 2 to 70% by weight.

The polyisocyanate is not particularly limited as long as the polyisocyanate is a compound having two or more isocyanate groups, and examples thereof can include aromatic compounds such as tolylene diisocyanate, 4,4'-diphenylmethane diisocyanate, xylylene diisocyanate and metaxylylene diisocyanate; aliphatic compounds such as hexamethylene diisocyanate; alicyclic compounds such as isophorone diisocyanate; a monomer thereof, a multimer such as a biuret-type, nurate-type or adduct-type product, and the like.

Examples of a commercial product of the polyisocyanate can include Duranate 24A-90PX (NCO: 23.6%, trade name, available from Asahi Kasei Corp.), Sumidur N-3200-90M (trade name, available from Sumika Covestro Urethane Co., Ltd.), TAKENATE D165N-90X (trade name, available from Mitsui Chemicals, Inc.), Sumidur N-3300, Sumidur N-3500 (any of these is a trade name, available from Sumika Covestro Urethane Co., Ltd.), Duranate THA-100 (trade name, available from Asahi Kasei Corp.), and the like. Moreover, blocked isocyanates prepared by blocking isocyanate groups thereof with blocking agents can also be used, as necessary.

The polyurethane acrylate (B1) may be a compound partially having a urea bond moiety.

In order to make the polyurethane acrylate have a urea bond moiety, some amount of a polyamine compound needs only to be used in the synthesis of polyurethane acrylate. The polyamine compound usable therein is not particularly limited, and examples thereof can include an aliphatic polyamine such as ethylenediamine, trimethylenediamine, tetramethylenediamine, pentamethylenediamine, hexamethylenediamine, triethylenetetramine, diethylenetriamine, triaminopropane, 2,2,4-trimethylhexamethylenediamine, 2-hydroxyethylethylenediamine, N-(2-hydroxyethyl)propylenediamine, (2-hydroxyethylpropylene)diamine, (di-2-hydroxyethylethylene)diamine, (di-2-hydroxyethylpropylene)diamine, (2-hydroxypropylethylene)diamine, (di-2-hydroxypropylethylene)diamine and piperazine; an alicyclic polyamine such as 1,2- or 1,3-cyclobutanediamine, 1,2-, 1,3- or 1,4-cyclohexanediamine, isophorone diamine (IPDA), methylenebiscyclohexane 2,4'- and/or 4,4'-diamine, and norbornanediamine; an aromatic diamine such as phenylenediamine, xylylenediamine, 2,4-tolylenediamine, 2,6-tolylenediamine, diethyltoluenediamine, 3,3'-dichloro-4,4'-diaminodiphenylmethane and 4,4-bis-(sec-butyl)diphenylmethane; a dimer diamine prepared by converting carboxyl groups of a dimer acid into amino groups, a dendrimer having a primary or secondary amino group at the terminal, and the like.

It is preferred that the double bond equivalent of the polyurethane acrylate (B1) be 130 to 600 g/eq, and it is further preferred that the double bond equivalent thereof be 150 to 300 g/eq. When the double bond equivalent is less than 130 g/eq, there is a fear that a problem in which the cured film is poor in crack resistance and impact resistance occurs. When the double bond equivalent is greater than 600 g/eq, there is a fear that a problem in which the resulting laminated film is poor in the scratch property, surface hardness and chemical resistance occurs.

It is preferred that the weight average molecular weight of the polyurethane acrylate (B1) be 3000 to 200000. When the weight average molecular weight is less than 3000, there is a fear that a problem in which the resulting laminated film is poor in blocking resistance occurs. When the weight average molecular weight is greater than 200000, the compatibility between the resulting polyurethane acrylate (B1) and a monomer/oligomer (B2) having an unsaturated double bond or the like contained in a clear coating composition is lowered. In addition, when the weight average molecular weight is greater than 200000, there is a tendency for the viscosity of a clear coating composition to be increased. Moreover, when a clear coating composition is diluted with an organic solvent in order to improve such an increase in viscosity, there is a fear that a problem in which the solid content in the clear coating composition is significantly lowered and the processability deteriorates occurs. In this connection, in the present specification, the weight average molecular weight was measured by a method described below.

It is preferred that the urethane concentration of the polyurethane acrylate (B1) be 300 to 2000 g/eq. When the urethane concentration is less than 300 g/eq, the compatibility between the resulting polyurethane acrylate (B1) and a monomer/oligomer (B2) having an unsaturated double bond or the like contained in a clear coating composition is lowered. In addition, when the urethane concentration is less than 300 g/eq, there is a tendency for the viscosity of a clear coating composition to be increased. Moreover, when a clear coating composition is diluted with an organic solvent in order to improve such an increase in viscosity, there is a fear that a problem in which the solid content in the clear coating composition is significantly lowered and the processability deteriorates occurs. When the urethane concentration is greater than 2000 g/eq, there is a fear that a problem in which the resulting laminated film is poor in blocking resistance and impact resistance occurs.

It is preferred that the urea concentration of the polyurethane acrylate (B1) be 500 to 1000 g/eq. When the urea concentration is less than 500 g/eq, the compatibility between the resulting polyurethane acrylate (B1) and a monomer/oligomer (B2) having an unsaturated double bond or the like contained in a clear coating composition is lowered. In addition, when the urea concentration is less than 500 g/eq, there is a tendency for the viscosity of a clear coating composition to be increased. Moreover, when a clear coating composition is diluted with an organic solvent in order to improve such an increase in viscosity, there is a fear that a problem in which the solid content in the clear coating composition is significantly lowered and the processability deteriorates occurs. When the urea concentration is greater than 1000 g/eq, there is a fear that a problem in which the resulting laminated film is poor in blocking resistance occurs.

The polyurethane acrylate (B1) may be a fluorine- and/or silicone-modified polyurethane acrylate. That is, the polyurethane acrylate (B1) may be a polyurethane acrylate synthesized by the above-described method using a monomer containing a fluorine or silicone unit, and may be a polyurethane acrylate obtained by making a functional group of the polyurethane acrylate (B1), which is obtained by the above-described method, react with a compound having a fluorine moiety and/or a silicone moiety.

(Monomer/Oligomer (B2) Having Unsaturated Double Bond)

As the monomer/oligomer (B2) having an unsaturated double bond, any known monomer/oligomer can be used, and for example, the following compounds can be used.

Examples of a (meth)acrylate with a functional group number of 2 include 1,4-butanediol di(meth)acrylate, 1,3-butanediol di(meth)acrylate, 1,6-hexanediol di(meth)acrylate, ethylene glycol di(meth)acrylate, diethylene glycol di(meth)acrylate, triethylene glycol di(meth)acrylate, polyethylene glycol di(meth)acrylate, dipropylene glycol di(meth)acrylate, tripropylene glycol di(meth)acrylate, polypropylene glycol di(meth)acrylate, neopentyl glycol di(meth) acrylate, hydroxypivalic acid neopentyl glycol di(meth) acrylate, 1,6-hexanediol di(meth)acrylate, 1,9-nonanediol di(meth)acrylate, 1,10-decanediol di(meth)acrylate, glycerin di(meth)acrylate, dimethyloltricyclodecane di(meth)acrylate, and the like. Of these, ethylene glycol di(meth)acrylate, diethylene glycol di(meth)acrylate, and the like can be preferably used.

Examples of a (meth)acrylate with a functional group number of 3 include trimethylolmethane tri(meth)acrylate, trimethylolpropane tri(meth)acrylate, trimethylolpropane ethylene oxide-modified tri(meth)acrylate, trimethylolpropane propylene oxide-modified tri(meth)acrylate, pentaerythritol tri(meth)acrylate, glycerin propoxytri(meth) acrylate, tris(2-(meth)acryloyloxyethyl)isocyanurate, and the like. Of these, trimethylolpropane trimethacrylate, pentaerythritol trimethacrylate, and the like can be preferably used.

Examples of a (meth)acrylate with a functional group number of 4 include dipentaerythritol tetra(meth)acrylate, pentaerythritol tetra(meth)acrylate, pentaerythritol ethylene oxide-modified tetra(meth)acrylate, pentaerythritol propylene oxide-modified tetra(meth)acrylate, ditrimethylolpropane tetra(meth)acrylate, and the like. Of these, ditrimethylolpropane tetra(meth)acrylate, pentaerythritol tetra(meth) acrylate, and the like can be preferably used.

Examples of a (meth)acrylate with a functional group number of 4 or more include polyfunctional (meth)acrylates such as pentaerythritol tetra(meth)acrylate, pentaerythritol ethylene oxide-modified tetra(meth)acrylate, ditrimethylolpropane tetra(meth)acrylate, dipentaerythritol tetra(meth) acrylate, dipentaerythritol penta(meth)acrylate, ditrimethylolpropane penta(meth)acrylate, propionic acid-modified dipentaerythritol penta(meth)acrylate, dipentaerythritol hexa(meth)acrylate, ditrimethylolpropane hexa(meth)acrylate, and a hexa(meth)acrylate of a caprolactone-modified product of dipentaerythritol. One kind of these monomers may be used alone, and two or more kinds thereof may be combinedly used.

Examples of the (meth)acryl-based oligomer include an epoxy (meth)acrylate, a polyester (meth)acrylate, a urethane (meth)acrylate, and the like. In this context, for example, the polyester acrylate-based prepolymer can be obtained by esterifying hydroxyl groups of a polyester oligomer having hydroxyl groups at both terminals, which is obtained by condensation between a polycarboxylic acid and a polyhydric alcohol, with (meth)acrylic acid or by esterifying a hydroxyl group of an oligomer at a terminal, which is obtained by subjecting a polycarboxylic acid to an addition reaction with an alkylene oxide, with (meth)acrylic acid. For example, the epoxy acrylate-based prepolymer can be obtained by making an oxirane ring of a bisphenol type epoxy resin or novolak type epoxy resin with a relatively low molecular weight react with (meth)acrylic acid to be esterified. In general, a urethane acrylate can be obtained by making a product, which is obtained by making a polyester polyol, polyether polyol or polycarbonate polyol react with an isocyanate monomer or isocyanate prepolymer, react with an acrylate monomer having a hydroxyl group.

One kind of these (meth)acryl-based oligomers may be used alone, and two or more kinds thereof may be combinedly used, and moreover, the (meth)acryl-based oligomer may be used in combination with the polyfunctional (meth) acrylate-based monomer.

As the monomer/oligomer (B2) having an unsaturated double bond, a commercially available monomer/oligomer such as UV 1700B available from The Nippon Synthetic Chemical Industry Co., Ltd. can also be used.

(Polymerization Initiator (B3))

The clear coating composition contains a polymerization initiator (B3) in addition to the polyurethane acrylate (B1) and the monomer/oligomer (B2) having an unsaturated double bond. As the polymerization initiator (B3), electromagnetic radiation polymerization initiators with which the polymerization is initiated by electromagnetic radiations such as ultraviolet rays (UV) and an electron beam, and radical polymerization initiators for thermosetting can be used but the polymerization initiator (B3) is not limited by these compounds.

Specifically, examples of the electromagnetic radiation polymerization initiator can include a benzoin-based compound such as benzoin methyl ether; an anthraquinone-based compound such as 2-ethylanthraquinone; a benzophenone-based compound such as benzophenone; a sulfide-based compound such as diphenyl sulfide; a thioxanthone-based compound such as 2,4-dimethylthioxanthone; an acetophenone-based compound such as 2,2-dimethoxy-2-phenylacetophenone; a phosphinoxide-based compound such as 2,4,6-trimethylbenzoin diphenylphosphinoxide; a polymerization initiator for ultraviolet ray (UV) curing such as IRGACURE (registered trademark)-184 and IRGACURE-819 (any of these is available from BASF Japan Ltd.), and the like. As the polymerization initiator, one kind of these compounds or two or more kinds thereof can be used.

As the radical polymerization initiators for thermosetting, organic peroxides such as t-amyl peroxy-2-ethylhexanoate, bis(4-t-butyl cyclohexyl) peroxydicarbonate, and Trigonox (Trademark) 121-50 (manufactured by Kayaku Akzo Corporation) can be used. As the organic peroxide to be used as the radical polymerization initiators for thermosetting, one kind of these compounds or two or more kinds thereof may be used.

(Blending Amounts of (B1) to (B3))

It is preferred that the active energy ray-curing type coating composition contain (B1) in a content lying within the range of 50 to 99 parts by weight and (B2) in a content lying within the range of 1 to 50 part(s) by weight in 100 parts by weight of the total amount ((B1)+(B2)) of the solid content weight of (B1) and the solid content weight of (B2), and (B3) in a content lying within the range of 0.5 to 20 part (s) by weight relative to 100 parts by weight of the total amount ((B1)+(B2)) of the solid content weight of (B1) and the solid content weight of (B2).

When the content of the polyurethane acrylate (B1) is less than 50 parts by weight, the resulting laminated film is not preferred in the point that the blocking resistance is lowered. When the content of the polyurethane acrylate (B1) is greater than 99 parts by weight, the resulting laminated film is not preferred in the point that the scratch resistance and surface hardness become insufficient. It is more preferred that the lower limit be greater than or equal to 55 parts by weight, and it is further preferred that the lower limit be greater than or equal to 65 parts by weight. It is more preferred that the upper limit be less than or equal to 98 parts by weight, and it is further preferred that the upper limit be less than or equal to 95 parts by weight.

When the content of the monomer/oligomer (B2) having an unsaturated double bond is less than 1 part by weight, the resulting laminated film is not preferred in the point that the scratch resistance and surface hardness become insufficient. When the content of the monomer/oligomer (B2) having an unsaturated double bond is greater than 50 parts by weight, the resulting laminated film is not preferred in the point that the blocking resistance is lowered. It is more preferred that the lower limit be greater than or equal to 2 parts by weight, and it is further preferred that the lower limit be greater than or equal to 5 parts by weight. It is more preferred that the upper limit be less than or equal to 45 parts by weight, and it is further preferred that the upper limit be less than or equal to 35 parts by weight.

When the content of the polymerization initiator (B3) is less than 0.5 parts by weight, the clear layer fails to be sufficiently cured, and there is a possibility that a clear coating film satisfactory in physical properties such as scratch resistance, surface hardness, chemical resistance and impact resistance fails to be obtained. When the content of the polymerization initiator (B3) is greater than 20 parts by weight, the unreacted polymerization initiator (B3) remains in the resulting clear coating film, and there is a possibility that the clear coating film is deteriorated due to outdoor sunlight and the like and the weather resistance becomes poor.

It is preferred that the clear coating composition contain a monomer having a thiol group and/or an amine group in an amount of 0.5 to 20 part(s) by weight.

The monomer having a thiol group and/or an amine group is not particularly limited, and examples thereof can include a thiol compound and an amine compound which are usually used.

As the amine compound, an aliphatic polyamine such as ethylenediamine, trimethylenediamine, tetramethylenediamine, pentamethylenediamine, hexamethylenediamine, triethylenetetramine and diethylenetriamine; an alicyclic polyamine such as 1,2- or 1,3-cyclobutanediamine, 1,2-, 1,3- or 1,4-cyclohexanediamine, isophorone diamine (IPDA), methylenebiscyclohexane 2,4'- and/or 4,4'-diamine, and norbornanediamine; an aromatic amine such as phenylenediamine, xylylenediamine, 2,4-tolylenediamine, 2,6-tolylenediamine, diethyltoluenediamine and 4,4-bis-(sec-butyl) diphenylmethane; a dimer acid diamine prepared by converting carboxyl groups of a dimer acid into amino groups, a dendrimer having an amino group at the terminal, or a polyamine having an amine moiety as a repeating structural unit can be used, but the amine compound is not limited thereto.

Examples of the thiol compound include bifunctional thiols such as 1,4-bis(3-mercaptobutyryloxy)butane, ethylene glycol dimercaptopropionate, diethylene glycol dimercaptopropionate, 4-t-butyl-1,2-benzenedithiol, bis(2-mercaptoethyl)sulfide, 4,4'-thiodibenzenethiol, benzenedithiol, glycol dimercaptoacetate, glycol dimercaptopropionate, ethylenebis(3-mercaptopropionate), polyethylene glycol dimercaptoacetate, polyethylene glycol di-(3-mercaptopropionate), 2,2-bis(mercaptomethyl)-1,3-propanedithiol, 2,5-dimercaptomethyl-1,4-dithiane, bisphenofluorene bis(ethoxy-3-mercaptopropionate), 4,8-bis(mercaptomethyl)-3,6,9-trithia-1,11-undecanedithiol, 2-mercaptomethyl-2-methyl-1,3-propanedithiol, 1,8-dimercapto-3,6-dioxaoctane and thioglycerolbismercapto-acetate; trifunctional thiols such as trimethylolpropane(trismercaptopropionate) (TMPTMP), trimethylolpropane tris(3-mercaptobutyrate), trimethylolpropane tris(3-mercaptopropionate), trimethylolethane tris(3-mercaptobutyrate), trimethylolpropane tris(3-mercaptoacetate), tris(3-mercaptopropyl)isocyanurate, 1,3,5-tris(3-mercaptobutyryloxyethyl)-1,3,5-triazin-2,4,6-(1H, 3H, 5H)-trione, 1,2,3-mercaptopropane and tris(3-mercaptopropionate)triethyl-1,3,5-triazin-2,4,6-(1H, 3H, 5H)-trione; and polyfunctional thiols such as poly(mercaptopropylmethyl)siloxane (PMPMS), 4-mercaptomethyl-3,6-dithia-1,8-octanedithiol pentaerythritol tetrakis(3-mercaptoacetate), pentaerythritol tetrakis(3- mercaptopropionate), dipentaerythritol hexakis(3-mercaptopropionate) and pentaerythritol tetrakis(3-mercaptobutyrate), but the thiol compound is not limited thereto.

Further preferably, it is preferred that the clear coating film layer (B), which is described above, used in the laminated film for decorating a three-dimensional molded product by vacuum forming according to the present disclosure be a clear coating film layer formed from a coating composition in which the polyurethane acrylate (B1) satisfies the requirements of
the double bond equivalent: 130 to 600 g/eq,
the molecular weight Mw: 3000 to 200000 and
the urethane concentration: 300 to 2000 g/eq. It is preferred that a polyurethane acrylate satisfying these requirements be used. When a clear coating film layer (B) is formed from such a clear coating composition, the clear coating film layer (B) is preferred because the resulting laminated film can be imparted with satisfactory blocking resistance, high scratch resistance, satisfactory surface hardness and satisfactory impact resistance. Furthermore, it is preferred that the polyurethane acrylate (B1) satisfies the requirement of the urea concentration: 500 to 1000 g/eq.

In this connection, the weight average molecular weight in the present specification was measured by means of the HLC-82220GPC available from Tosoh Corporation. The measurement conditions are as follows.
Column: Three TSKgel Super Multipore HZ-M columns
Developing solvent: Tetrahydrofuran
Column injection port oven 40° C.
Flow rate: 0.35 ml/min.
Detector: RI
Standard polystyrene: Tosoh Corporation PS oligomer kit
(Additional Components)

In a clear coating composition, a compound which is usually added as a coating material may be contained as an additional component in addition to the polyurethane acrylate (B1), the monomer/oligomer (B2) having an unsaturated double bond and the polymerization initiator (B3). Examples of the additional component can include an ultraviolet ray absorber (UVA), a photostabilizer (HALS (hindered amine light stabilizer)), a resin for binder, a crosslinking agent, a pigment, a surface conditioner, a defoaming agent, a conductive filler, a solvent and the like.

Furthermore, a solvent may be used for the purposes of mixing the respective components to be contained in the clear coating composition and the viscosity control of the component. As the solvent, for example, one kind of conventionally known organic solvents such as ester-based, ether-based, alcohol-based, amide-based, ketone-based, aliphatic hydrocarbon-based, alicyclic hydrocarbon-based and aromatic hydrocarbon-based solvents which are used for a coating may be used alone or these organic solvents may be used in combination of two or more kinds thereof. In this connection, in the case of using the solvent, when a volatile substance is left behind in a laminated film, there are cases where the volatile substance volatilizes and transpires at the time of decorating a base material to generate pinholes and swelling. As such, it is preferred that the volatile substance contained in the laminated film be sufficiently reduced.

Furthermore, it is preferred that the clear coating composition further contain inorganic/organic filler with an average primary particle diameter of less than or equal to 100 nm in an amount of 0.5 to 60 part(s) by weight. On this account, it is possible to improve the blocking resistance, high scratch resistance and surface hardness. It is more preferred that the lower limit of the blending amount be 1% by weight, and it is more preferred that the upper limit thereof be 50% by weight.

Examples of the inorganic filler include silica, impalpable powder of glass, alumina, calcium carbonate, kaolin, clay, sepiolite (magnesium silicate), talc (magnesium silicate), mica (aluminum silicate), xonotlite (calcium silicate), aluminum borate, hydrotalcite, wollastonite (calcium silicate), potassium titanate, titanium oxide, barium sulfate, magnesium sulfate, magnesium hydroxide, yttria, ceria, silicon carbide, boron carbide, zirconia, aluminum nitride, silicon nitride or a eutectic mixture thereof, or a nonmetallic inorganic material obtained after subjected to molding, firing or the like, the so-called ceramic filler. Of these, from aspects of the price and the effect, silica, alumina, zirconia or a eutectic mixture thereof is preferred.

Examples of the organic filler include beads of the respective resins of acryl, styrene, silicone, polyurethane, acrylic urethane, benzoguanamine and polyethylene.

Moreover, as a commercially available one, organosilica sol MIBK-ST, MEK-ST-UP, MEK-ST-L or MEK-AC-2140Z (available from Nissan Chemical Industries, Ltd.), SIRMIBK15ET %-H24, SIRMIBK15ET %-H83 or ALMIBK30WT %-H06 (CIK Nanotek Corporation) or the like can be used.

The clear coating composition may be a clear coating composition containing a polyisocyanate compound having an isocyanate group in an amount of 0.5 to 20% by weight (solid content ratio in the coating). When the polyisocyanate compound is blended thereinto, the clear coating composition is preferred in the point that the resulting laminated film can be imparted with formability (stretchability) and scratch resistance. It is more preferred that the lower limit of the blending amount be 2% by weight, and it is more preferred that the upper limit thereof be 18% by weight.

A film thickness of the clear coating film is not particularly limited but preferably 3 to 60 µm.

Regardless of the depth of the unevenness on the surface, it is preferred to keep the predetermined film thickness for maintaining performances such as a surface hardness and a crack resistance. Further, the clear coating is needed to be penetrated sufficiently to the unevenness on the film surface for faithfully transferring the uneven design on the surface so that a lower viscosity of the coating is preferred. The viscosity value depends on a method for forming the coating film but it is preferably 50 mPa·s to 5000 mPa·s, more preferably 100 mPa·s to 3000 mPa·s. If the viscosity value is less than the above-mentioned range, it is difficult to keep the film thickness and the workability is deteriorated. If the viscosity value is over the above-mentioned range, the clear coating is not sufficiently penetrated to the unevenness on the film surface so that the design cannot be faithfully transferred. Further, defects such as a blister may be caused because air remains.

Figure 7:
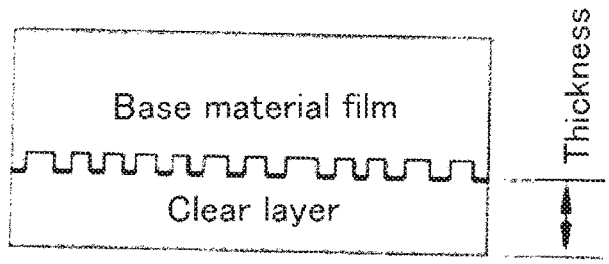
FIG. 7 is a schematic view explaining the definition of a thickness of the clear coating film layer (B) of the present disclosure.

In this specification, the film thickness of the clear coating film layer means a value measured on the basis of the concave part of the unevenness on the clear coating film layer as shown in FIG. 7.

(Design Layer (C))

In the present disclosure, a design layer (C) is a layer which makes a design appearance given by the laminated film for decorating a three-dimensional molded product. As such a layer, a layer formed by applying a coloring coating composition and drying, a layer formed by printing, and a metallic tone design layer may be used. These layers are described respectively below.

(Design Layer Formed from a Coloring Coating Composition)

A coloring coating composition to be used for forming the design layer (C) is not particularly limited but preferably contains a urethane resin (C1) and a luster material (C2). The coloring coating composition may further contain components such as an ultraviolet ray absorber (UVA), a photostabilizer (HALS (hindered amine light stabilizer)), a resin for binder, a crosslinking agent, a pigment, a surface conditioner, a defoaming agent, a conductive filler, a solvent and the like other than the above-mentioned each component. The coloring coating composition may be cured by electromagnetic radiations, or may be thermoplastic or thermosetting.

When an adhesion layer is not provided, the design layer preferably has an adhesion function.

That is, the design layer (C) is preferably formed from a coloring coating composition in which a resin having a high adhesion property is used.

(Urethane Resin (C1))

A urethane resin (C1) to be used in the coloring coating composition is not particularly limited but preferably has a weight average molecular weight Mw of 10,000 to 200,000, more preferably 30,000 to 150,000. When the weight average molecular weight Mw is less than 10,000, the flexibility of the design layer (C) is reduced. When the weight average molecular weight Mw is more than 200,000, the coloring coating composition becomes difficult to be produced and applied on a film.

The urethane resin (C1) preferably has a Tg of −30° C. to 30° C. When the Tg is less than −30° C., the tackiness of coating film (blocking) after applying and drying may be reduced. When the Tg is more than 30° C., the defective forming due to the increasing of coating film hardness and the deterioration of physical properties at low temperatures as product may be generated.

Figure 6:
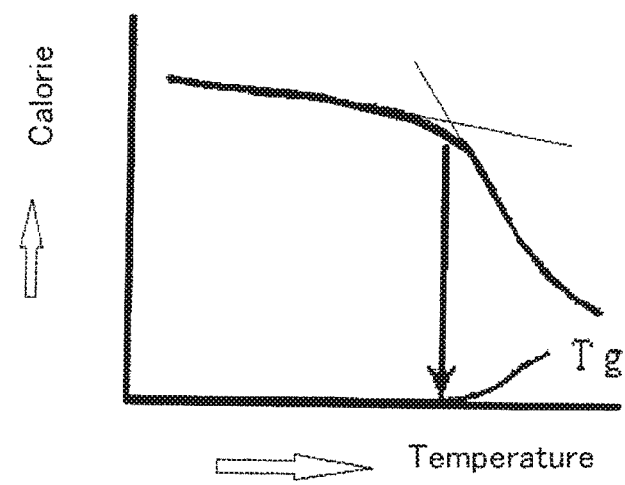
FIG. 6 is a view definitely showing a method for reading Tg from a chart as for a method for measuring Tg in the present disclosure.

In the present specification, the Tg means a value measured by the following processes using differential scanning calorimeter (DSC) (thermal analysis equipment SSC5200 (manufactured by Seiko Instruments inc.)). That is, a process of heating from 20 to 150° C. at heating rate of 10° C./min. (process 1), a process of cooling from 150 to −50° C. at cooling rate of 10° C./min. (process 2), and a process of heating from −50 to 150° C. at heating rate of 10° C./min. (process 3) were done in order, and the value was obtained in the process 3. That is, the temperature indicated by the arrow of chart in the FIG. 6 was determined as Tg.

(Luster Material (C2))

The luster material (C2) is not particularly limited but preferably at least one compound selected from the group consisting of an aluminum, a glass, an inorganic pigment, and an organic pigment. More specifically, metallic pigments using a metallic luster material such as a metal or an alloy including a coating aluminum, an aluminum flake, copper, zinc, nickel, tin, and aluminum oxide, and mica pigments such as an interference mica, and a white mica may be used.

The coloring coating composition preferably contains (C2) of 0.5 to 60 parts by weight relative to 100 parts by weight of the total amount ((C1)+(C2)) of the solid content weight of (C1) and the solid content weight of (C2).

(Additional Components)

As the resin for binder and the crosslinking agent to be contained in the coloring coating composition as the additional components, for example, a modified acrylic resin, a polyester resin, an epoxy resin, an olefin resin, a modified olefin resin, a melamine resin, a polyisocyanate compound, a blocked polyisocyanate compound, and the like may be included. Further, as the solvent to be contained in the coloring coating composition, one kind of organic solvents, which can be used usually in a coating, such as an ester solvent, an ether solvent, an alcohol solvent, an amide solvent a ketone solvent, an aliphatic hydrocarbon solvent, an alicyclic hydrocarbon solvent, and an aromatic hydrocarbon solvent may be used alone, and two or more kinds thereof may be combinedly used. When the above-mentioned solvent is used, if a volatile substance is remained in the laminated film, the volatile substance is volatilized at the time of decorating the base material so that a pinhole or a blister may be generated. Therefore, it is preferred to sufficiently reduce the content of the volatile substance in the laminated film.

(Design Layer (C) Formed by Printing)

The laminated film for decorating a three-dimensional molded product by vacuum forming according to the present disclosure may be a laminated film having a design layer (C) formed by printing. When such a layer is provided, the resulting laminated film is preferred in the point that a specific appearance attributed to the combination of a printing layer and an uneven design can be attained. The method for printing is not particularly limited, and the design layer can be formed by a known method such as inkjet printing, screen printing, offset printing or flexographic printing. In particular, when inkjet printing is adopted, the resulting laminated film is preferred in the point that various printing layers can be formed inexpensively. Moreover, at the time of printing, an energy ray-curing type ink may be used to perform printing.

(Metallic Tone Design Layer (C))

In the present disclosure, a metallic tone design layer (C) such as a coating film layer (C-1) containing vapor-deposited aluminum and a vapor-deposited metal layer (C-2) composed of indium or tin may be formed in order to make a three-dimensional molded product have an excellent metallic tone appearance as if the three-dimensional molded product were made of metal. Since such metallic tone design layer (C) is formed, not only a satisfactory metallic appearance can be attained but also decorating which does not generate a crack or white turbidity attributed to stretching at the time of subjecting a three-dimensional molded product to decorating and makes the three-dimensional molded product have a satisfactory metallic tone can be performed.

The coating film layer (C-1) containing vapor-deposited aluminum and the vapor-deposited metal layer (C-2) composed of indium or tin will be described in detail.

(Coating Film Layer (C-1) Containing Vapor-Deposited Aluminum)

First of all, as the coating film layer constituting the metallic tone design layer, one formed of a coating containing a vapor-deposited aluminum pigment is exemplified.

Examples of such a coating film layer (C-1) containing a vapor-deposited aluminum pigment can include one formed of a metallic base coating containing 30 to 85% by weight of a vapor-deposited aluminum pigment relative to the amount of solid matter in the coating.

The vapor-deposited aluminum pigment is one prepared by shredding a vapor-deposited aluminum film into flaky pieces. For example, a plastic film such as oriented polypropylene, crystalline polypropylene or polyethylene terephthalate is used as a base film, a release agent is applied thereon, and aluminum vapor deposition can be performed on the release agent to produce such a non-leafing vapor-deposited aluminum pigment.

Unlike an ordinary aluminum pigment such as an aluminum flake, the vapor-deposited aluminum pigment has little particle feeling, and thereby, a design layer having a mirror surface-shaped appearance which is like a metal surface can be provided.

It is more preferred that the vapor-deposited aluminum pigment be a non-leafing vapor-deposited aluminum pigment. It is preferred that the particle diameter of the non-leafing vapor-deposited aluminum pigment be 3 to 20 μm and it is preferred that the thickness of the vapor-deposited aluminum film be 0.01 to 0.1 μm. By making the pigment have a particle diameter mentioned above, a metallic tone new design with little particle feeling can be attained. It is more preferred that the particle diameter be 5 to 15 μm. In this connection, the particle diameter in the present specification refers to a value obtained by being measured with a laser diffraction particle size analyzer LA-910 (available from HORIBA Ltd.). Examples of a commercially available non-leafing vapor-deposited aluminum, which can be used in the present disclosure, can include Metasheen 11-0010, 41-0010, 71-0010, 91-0010, MS-750 or MS-650 (available from Ciba Specialty Chemicals), Silverline P1000 or P4100, Metalure L or Metalure A21010BG (available from Eckart GmbH), and the like.

In this connection, a leafing treatment refers to a treatment in which the surface of aluminum is treated with a hydrophobic agent and/or a lipophobic agent. It is preferred that the non-leafing vapor-deposited aluminum pigment used in the present disclosure be a non-leafing vapor-deposited aluminum pigment which has not been subjected to such a leafing treatment. In the case of using leafing vapor-deposited aluminum, the adhesive force thereof to the coating film layer adjacent thereto is lowered and a trouble of adhesion occurs. Accordingly, in the present disclosure, it is preferred that non-leafing vapor-deposited aluminum be used.

The content of the vapor-deposited aluminum pigment is 30 to 85% by weight relative to the whole amount of solid matter in the coating film layer (C-1) containing vapor-deposited aluminum. When being less than 30% by weight, a brilliant coating film satisfying the sense of dense metallic sheen is not obtained, and when being greater than 85% by weight, physical properties of a coating film are lowered. The content of the non-leafing vapor-deposited aluminum pigment is more preferably 40 to 80% by weight.

The coating film layer (C-1) containing vapor-deposited aluminum further contains a binder resin in addition to the non-leafing vapor-deposited aluminum pigment. The binder resin is not particularly limited and examples thereof can include a vinyl chloride resin, an acrylic resin, a urethane resin, a polyester resin and the like, and among these, two or more kinds thereof may be mixed to be used. Of these, a vinyl chloride resin is especially preferred.

As the vinyl chloride resin, one available from the market can be used. The vinyl chloride resin may be a single polymer of vinyl chloride and may be a copolymer of vinyl chloride and an additional vinyl monomer copolymerizable therewith. More specifically, examples of the copolymer can include a copolymer of vinyl chloride and vinyl acetate, maleic anhydride or a kind of ester thereof, vinyl ether, acrylic acid, an acryl-based hydroxyl group-containing monomer and the like.

The polymerization degree of each of these vinyl chloride resins is usually 200 to 2000 and preferably 300 to 1000. Examples of a commercial product of the vinyl chloride resin easily available can include SOLBIN C, CN, A, TA2, TAO, TAOL or M5 available from Nissin Chemical Industry Co., Ltd.; Vinnol H11/59, E15/48A, LL4320 or E15/45M available from Wacker Chemie AG; VYHD, VAGD, VMCH or VMCC available from The Dow Chemical Company UCAR, and the like. Among these, two or more kinds thereof can also be mixedly used.

The coating film layer (C-1) containing vapor-deposited aluminum may be one prepared by being added with an aluminum aggregation preventing agent. In this case, the coating film layer is preferred in the point that cohesive failure between aluminum and the resin can be suppressed by the action of the aluminum aggregation preventing agent. Specifically, as the aluminum aggregation preventing agent, Dianal RE360 (available from MITSUBISHI RAYON CO., LTD.) and the like can be used.

The coating film layer (C-1) containing vapor-deposited aluminum can contain an additional brilliant pigment and/or a colored pigment other than the specific non-leafing vapor-deposited aluminum pigment.

Examples of the additional brilliant pigment include at least one kind of pigment selected from the group consisting of a metal oxide-coated alumina flake pigment, a metal oxide-coated silica flake pigment, a graphite pigment, a metal oxide-coated mica pigment, a metal titanium flake pigment, a stainless steel flake pigment, a sheet-like iron oxide pigment, a metal-plated glass flake pigment, a metal oxide-coated glass flake pigment, a hologram pigment and a flake-like pigment composed of a cholesteric liquid crystal polymer, and more preferred examples thereof include at least one kind of pigment selected from the group consisting of a metal oxide-coated alumina flake pigment, a metal oxide-coated silica flake pigment, a graphite pigment, a metal oxide-coated mica pigment and a metal oxide-coated glass flake pigment.

Examples of the colored pigment include an azo lake-based pigment, a phthalocyanine-based pigment, an indigo-based pigment, a perylene-based pigment, a quinophthalone-based pigment, a dioxadine-based pigment, a quinacridone-based pigment, an isoindolinone-based pigment and a metal complex pigment, and moreover, examples of an inorganic pigment include yellow iron oxide, Bengala (red iron oxide), titanium dioxide and carbon black.

Other than the above-mentioned components, polyethylene wax, a sedimentation-preventing agent, a curing catalyst, an ultraviolet ray absorber, an oxidation inhibitor, a leveling agent, a surface conditioner such as silicone and an organic polymer, a dribble preventing agent, a thickener, a defoaming agent, crosslinkable polymer particles (microgel) and the like can be appropriately added to the metallic base coating for forming the coating film layer (C-1) containing vapor-deposited aluminum to be contained therein. The metallic base coating can be formed into a solvent-based coating, a water-based coating or the like.

It is preferred that the coating film layer (C-1) containing vapor-deposited aluminum have a thickness of 0.05 to 5 μm. When being made to lie outside the above-mentioned range, the layer is not preferred in the point that problems on white turbidity, a crack and the like are liable to be generated.

As shown in FIG. 2, if the adhesion layer is not provided, the design layer preferably has an adhesion function. That is, the design layer (C) is preferably formed from a coloring coating composition containing a high adhesive resin.

(Vapor-Deposited Metal Layer (C-2) Composed of Indium or Tin)

First, the vapor-deposited metal layer will be described.

Vapor deposition refers to a method of heating a vapor deposition material in a vacuumized vessel to make the vapor deposition material vaporize and making the vapor deposition material stick to the surface of a base material arranged at a position apart therefrom to form a thin film. In the present disclosure, the metal used for vapor deposition is tin or indium. Since a degree of vacuum of $10^{-3}$ to $10^{-4}$ Pa or so is required for the vapor deposition, it is necessary for the inside of a vessel to be once kept at a vacuum state. Therefore, the vapor deposition is performed by a complete batch processing method and cannot be performed by a continuous processing method.

Moreover, in general, a vacuum deposition method for a film includes the steps of (1) setting a film roll and a target metal in a chamber, (2) evacuating the inside of the chamber to a vacuum ($10^{-3}$ to $10^{-4}$ Pa) and making the film start traveling, (3) heating the target to generate vapor and making the metal deposit on the film surface, and (4) releasing the internal pressure of the chamber to the atmosphere after the completion of vapor deposition. As compared with a direct vapor deposition against a part, in spite of being a batch processing method, the economic efficiency is high because a 1-roll portion of the film is continuously processed. Moreover, there is an advantage that the thickness and quality of a vapor-deposited film is easily controlled. However, the film cannot be applied to a three-dimensionally shaped article as it is.

The vapor-deposited metal layer (C-2) composed of indium or tin in the present disclosure can be formed by an ordinary vapor deposition method using each of these metals. Since a metal layer satisfactory in elongation can be obtained by using indium or tin, in the case of being formed into a three-dimensional shape, a crack or white turbidity is not generated and the appearance is not adversely affected.

Since a layer composed of indium or tin is used as the vapor-deposited metal layer in the present disclosure, by virtue of the action called discontinuous vapor deposition, the laminated film of the present disclosure has an advantage that a crack or white turbidity is hardly generated.

In the case of forming such a vapor-deposited metal layer, it is preferred that the thickness thereof be 0.05 to 5 μm. By making the vapor-deposited metal layer have such a thickness, the above-described objects can be satisfactorily achieved.

(Release Layer (D))

When the release layer (D) is provided in the present disclosure, any known release layer can be used, and for example, the release layer can be formed from a silicone-based release agent and the like.

It is preferred that the peel strength between the release layer (D) and the clear coating film layer (B) be 0.05 to 8.0 N/25 mm, and it is further preferred that the peel strength therebetween be 0.1 to 5.0 N/25 mm. When being less than 0.05 N/25 mm, for example, the base material film layer (A) peels off at the time of the film production or decorative forming, these layers are poor in workability, and moreover, when being greater than 8.0 N/25 mm, when peeling off a film after forming, there is a fear that the film becomes difficult to be peeled off.

(Adhesion Layer (E))

At the time of decorating a base material with a laminated film, the adhesion layer (A) is used for bringing the laminated film into close contact with the base material surface to be made to bond thereto.

An adhesive agent contained in the adhesion layer is not particularly limited as long as the adhesive agent is a conventionally known adhesive agent, and examples thereof can include VYLON UR-3200 (available from TOYOBO CO., LTD.), UR-1361ET (available from TOAGOSEI CO., LTD.) and the like.

The adhesive agent may be one formed by allowing an adhesive agent to be applied/dried and may be one formed by laminating an adhesive sheet.

(Protective Layer (F))

The laminated film for decorating a three-dimensional molded product by vacuum forming according to the present disclosure is preferably a laminated film in which a protective layer (F) is further formed so as to be made adjacent to the design layer (C), especially if a metallic tone design layer is provided as the design layer (C). That is, in the case of providing a metallic tone design layer (C) at a position where the metallic tone design layer (C) is in contact with a clear coating film layer (B), the metallic tone design layer (C) moves when the clear coating film layer (B) in an uncured state moves due to being stretched in the uncured state, and there are cases where this causes deterioration in appearance.

Furthermore, in the case where the metallic tone design layer (C) is constituted of a vapor-deposited metal layer (C-2) composed of indium or tin, in the production thereof, there are cases where the vapor-deposited metal layer is difficult to be formed on the clear coating film layer (B) in an uncured state. Accordingly, also from the viewpoint of reducing such problems, it is desirable that a protective layer (F), which makes the vapor deposition property satisfactory, be provided to improve such problems.

The protective layer (F) is not particularly limited, and for example, resins such as an acrylic resin, a vinyl chloride-vinyl acetate copolymer, a polyamide resin, a polyester resin, a urethane resin, an epoxy resin and a styrene resin can be used, a urethane resin is preferred, and a urea bond-containing urethane resin is further preferred. One kind thereof can be used alone or two or more kinds thereof can be combinedly used to be blended.

(Ultraviolet Ray-Absorbing Layer (G))

When an ultraviolet ray-absorbing layer (G) is provided, the ultraviolet ray-absorbing layer (G) preferably satisfies the parameters that the strength is 3 to 1000 N/cm$^2$ at 40 to 130° C., the surface tension is 20 to 60 mN/m, and the ultraviolet transmittance is 20% or less at 290 nm to 430 nm wavelength.

When the strength is low, the layer may be swollen at the time of forming. On the other hand, if the strength is high, the formability may be insufficient. In addition, if the surface tension is low, the ink spreads, and if the surface tension is high, the repelling of ink is occurred. In both cases, a good printing image may not be obtained. Further, when the ultraviolet transmittance is high, a sufficient ultraviolet ray-blocking effect cannot be obtained. That is, the ultraviolet ray-absorbing layer (C) has a sufficient surface tension to perform inkjet printing, a sufficient ultraviolet ray-blocking performance to prevent the curing of the clear coating film layer and an enough strength not to occur defects at the time of forming.

The strength of the ultraviolet ray-absorbing layer (G) is decided by measuring the film strength of the ultraviolet ray-absorbing layer alone by the use of Autograph AG-IS manufactured by Shimadzu corporation under the conditions that the temperature is 60° C., the tensile speed is 50 mm/min. and the elongation is 200%.

The surface tension of the ultraviolet ray-absorbing layer (G) is calculated by measuring a contact angle of the layer to water and iodide methylene by the use of an automatic contact angle meter DSA20 (manufactured Kurz, Inc.).

The ultraviolet transmittance of the ultraviolet ray-absorbing layer (G) is measured by using an ultraviolet-visible spectrophotometer U-4100 (Hitachi High-Technologies) at 290.0 nm to 430.0 nm wavelength.

Preferably, the ultraviolet ray-absorbing layer (G) absorbs the ultraviolet ray but easily transmits a visible ray. If the visible ray is not transmitted, the design layer is made hardly visible from outside.

The ultraviolet ray-absorbing layer (G) is a layer formed from a coating composition containing a binder resin (G1) and an ultraviolet ray absorber (G2). The layer which satisfies the above-mentioned parameters can be formed by adjusting a formulation and a combination of these compounds.

The binder resin (G1) is not particularly limited, and resins such as an acrylic resin, a vinyl chloride-vinyl acetate copolymer, a polyamide resin, a polyester resin, a urethane resin, an epoxy resin and a styrene resin can be used. Among them, a urethane resin is preferred, and a urea bond-containing urethane resin is further preferred. One kind thereof can be used alone or two or more kinds thereof can be combinedly used to be blended.

It is preferred that the content thereof lie within the range of 85 to 99% by weight relative to the whole amount of the ultraviolet ray-absorbing layer (G).

The ultraviolet ray absorber (G2) is not particularly limited, and for example, a triazine-based ultraviolet ray absorber, a benzophenone-based ultraviolet ray absorber, a benzotriazole-based ultraviolet ray absorber, a cyanoacrylate-based ultraviolet ray absorber, a hydroxybenzoate-based ultraviolet ray absorber and the like can be used.

The triazine-based ultraviolet ray absorber includes, for example, 2-(2-hydroxy-4-methoxyphenyl)-4,6-diphenyl-s-triazine, 2-(2-hydroxy-4-hydroxymethylphenyl)-4,6-diphenyl-s-triazine, 2-(2-hydroxy-4-hexyloxyphenyl)-4,6-diphenyl-s-triazine, 2-(2-hydroxy-4-hydroxymethylphenyl)-4,6 bis (2,4-dimethylphenyl)-s-triazine, 2-[2-hydroxy-4-(2-hydroxyethyl)phenyl]-4,6-diphenyl-s-triazine, and the like.

The benzophenone-based ultraviolet ray absorber includes, for example, 2-hydroxybenzophenone, 5-chloro-2-hydroxybenzophenone 2,4-dihydroxybenzophenone, 2,2',4,4'-tetrahydroxy benzophenone, 2-hydroxy-4-methoxy benzophenone, 2-hydroxy-4-methoxy benzophenone-5-sulfonic acid, 2-hydroxy-4-n-octoxybenzophenone, 2-hydroxy-4-n-dodesiloxy benzophenone, 2-hydroxy-4-n-benzyloxy benzophenone, 2-hydroxy-4-n-octadesiloxy benzophenone, 2,2'-dihydroxy-4-methoxy benzophenone, 2,2'-dihydroxy-4,4'-dimethoxy benzophenone, 2,2'-dihydroxy-4,4'-diethoxy benzophenone, 2,2'-dihydroxy-4,4'-dipropoxy benzophenone, 2,2'-dihydroxy-4,4'-dibutoxy benzophenone, 2,2'-dihydroxy-4-methoxy-4'-propoxy benzophenone, 2,2'-dihydroxy-4-methoxy-4'-butoxy benzophenone, 2,3,4-trihydroxy benzophenone, 2,2'-dihydroxy-4,4'-di(hydroxymethyl)benzophenone, 2,2'-dihydroxy-4,4'-di(2-hydroxyethyl)benzophenone, 2,2'-dihydroxy-3,3'-dimethoxy-5,5'-di(hydroxymethyl) benzophenone, 2,2'-dihydroxy-3,3'-dimethoxy-5,5'-di(2-hydroxyethyl) benzophenone, and the like.

The benzotriazole-based ultraviolet ray absorber includes, for example, 2-(2-hydroxy-5-t-methylphenyl)-2H-benzotriazole, 2-(2-hydroxy-3,5-di-t-butylphenyl)-2H-benzotriazole, 2-(2'-hydroxy-5'-t-octylphenyl)-2H-benzotriazole, 2-[2'-hydroxy-5'-(hydroxymethyl)phenyl]-2H-benzotriazole, 2-[2'-hydroxy-5'-(2-hydroxyethyl)phenyl]-2H-benzotriazole, 2-[2'-hydroxy-5'-(3-hydroxypropyl)phenyl]-2H-benzotriazole, 2-[2'-hydroxy-3'-methyl-5'-(hydroxymethyl)phenyl]-2H-benzotriazole, and the like.

The cyanoacrylate-based ultraviolet ray absorber includes, for example, 2-ethylhexyl-2-cyano-3,3'-diphenyl acrylate, ethyl-2-cyano-3,3'-diphenyl acrylate, methyl-2-cyano-3-methyl-3-(p-methoxyphenyl)acrylate, and the like.

The hydroxybenzoate-based ultraviolet ray absorber includes, for example, phenyl salicylate, resorcinol monobenzoate, 4-t-butylphenyl salicylate, 2,5-t-butyl-4-hydroxybenzoic acid n-hexadecyl ester, 2,4-di-t-butyl-phenyl-3',5-di-t-butyl-4'-hydroxybenzoate, 2,4-di-t-amylphenyl-3',5-di-t-butyl-4'-hydroxybenzoate, hexadecyl-3',5-di-t-butyl-4'-hydroxybenzoate and the like.

As the ultraviolet ray absorber (G2), the triazine-based ultraviolet ray absorber, the benzophenone-based ultraviolet ray absorber, and the benzotriazole-based ultraviolet ray absorber are preferred because these absorbers have a high ultraviolet ray-absorbing property at wide ranges of wavelength regions from the short wavelength region to the long wavelength region (about 280 to 360 nm).

The ultraviolet ray absorber may be used singly or two or more of them may be used in admixture.

Specifically, Tinuvin 400, 900, 447, and 1130 (manufactured by BASF) may be used. A blending amount of the ultraviolet ray absorber (G2) depends on the kind of ultraviolet ray absorber to be used, and is not particularly limited as long as the above-mentioned condition of ultraviolet transmittance is satisfied. However, it is preferably 1 to 15% by weight relative to the total amount of the ultraviolet ray-absorbing layer (G), more preferably 3 to 10% by weight. If the amount is less than 1% by weight, the ultraviolet ray-blocking effect may become insufficient. If the amount is over 15% by weight, the strength of the ultraviolet ray-absorbing layer may be reduced and the formability may become insufficient, resulting in increased costs.

The ultraviolet ray-absorbing layer (G) may contain a surface conditioner (G3). That is, it may be hard to adjust the surface tension within the above-mentioned range depending on the type of the resin to be used in the ultraviolet ray-absorbing layer (G). In this case, the surface tension can be adjusted within the above-mentioned range by blending the surface conditioner (G3).

The surface conditioner (G3) is not particularly limited but may include polyether-modified polydimethylsiloxane, polyether-modified polymethylalkylsiloxane, aralkyl-modified polymethylalkylsiloxane and the like. Specifically, BYK-300, BYK-342, and BYK-349 (manufactured by BYK) may be used.

An amount of the surface conditioner (G3) to be blended is not particularly limited and preferably 0.01 to 5% by weight relative to the total amount of the ultraviolet ray-absorbing layer (G).

A thickness of the ultraviolet ray-absorbing layer (G) is not particularly limited but preferably 3 to 30 μm, and more preferably 5 to 25 μm. When the thickness is too thin, the sufficient ultraviolet ray-shielding performance and strength tend to be difficult to be obtained. If the thickness is too thick, the performances will not be improved especially. Further, not only the cost is increased, but also the coating and drying operations become difficult.

(Breaking Elongation)

It is preferred that the laminated film for decorating a three-dimensional molded product by vacuum forming according to the present disclosure be a laminated film having a breaking elongation of 30 to 400% at 40 to 130° C. before curing. That is, by making a laminated film have such a breaking elongation within the above-mentioned temperature range, the laminated film can easily cope with vacuum forming and effects of the present disclosure can be suitably attained. Components for the respective layers constituting the film can be adjusted to make the breaking elongation lie within such a numerical value range. In the present disclosure, "having a breaking elongation of 30 to 400% at 40 to 130° C." means enabling sufficient stretchability to be attained by making the temperature region in which the breaking elongation of 30 to 400% is exhibited lie within a range of 40 to 130° C. and performing the forming at a temperature within the range.

In this connection, the breaking elongation refers to a value obtained by measuring a laminated film in a state of including a base material film layer (A) at a tensile speed of 50 mm/min within the temperature range of 40 to 130° C. by means of the Autograph AG-IS available from SHIMADZU CORPORATION to measure the elongation at the point of time when any of the layers is broken. Depending on the nature of the film, the breaking elongation needs only to lie within the above-described range at any arbitrary temperature within the range of 40 to 130° C.

(Production Method of Laminated Film)

The respective layers, other than the base material film layer (A), which constitute the laminated film for decorating a three-dimensional molded product by vacuum forming according to the present disclosure can be formed by dissolving the component constituting each layer in a solvent to prepare a coating composition, applying the coating composition on a base material film layer (A) and drying the coating film. The design layer (C) may be formed by the printing as mentioned above.

The application method for forming each layer mentioned above is not particularly limited, and for example, the spray application by spraying may be performed and the application may be performed by means of an applicator, a die coater, a bar coater, a roll coater, a comma coater, a roller brush, a paintbrush, a spatula or the like. After a coating solution is applied by the application method, in order to remove the solvent in the coating solution, the coating solution as a coating film is subjected to drying by heating and the coating film can be formed into each layer.

Moreover, as described above, with regard to the adhesion layer (E), without adopting the method of coating/drying, a method of bonding as a lamination method may be adopted. That is, a laminated film may be formed by a method of preparing a film formed from an adhesion layer (E) and making this film bond to a film by a lamination technique.

In the case where the design layer (C) is constituted of a vapor-deposited metal layer (C-2) composed of indium or tin, it is necessary to perform the formation of a vapor-deposited metal layer. The method of forming such a vapor-deposited metal layer is not particularly limited, and the formation can be performed by a conventional known method.

(Usage)

In the case of decorating a base material with the laminated film for decorating a three-dimensional molded product by vacuum forming according to the present disclosure, the decorating needs only to be similarly performed according to a conventionally known procedure of vacuum forming, and the method is not particularly limited. That is, the base material film layer (A) is peeled off from the laminated film as necessary, and the laminated film is press-bonded to a base material so that the adhesion layer faces the base material surface and the laminated film is brought into close contact with the base material surface to perform the decorating. Afterward, electromagnetic irradiation or heating is performed and the respective layers are cured to obtain a coating film. Moreover, the base material film layer (A) may be peeled off after press-bonding and curing.

In this connection, a base material which can be suitably decorated with the laminated film according to the present disclosure is not particularly limited, and examples thereof can include an automobile exterior part such as a bumper, a front under spoiler, a rear under spoiler, a side under skirt, a side garnish and a door mirror, an automobile interior part such as an instrument panel, a center console and a door switch panel, a housing for a mobile phone, an audio product, a home electric appliance such as a refrigerator, a fan heater and a lighting apparatus, a washstand dressing table, or the like.

Examples

Hereinafter, the present disclosure will be described by reference to examples. In examples, with regard to the blending proportion, % means % by weight unless otherwise stated. The present disclosure is not limited to the examples described below.

(Synthesis Example Synthesis of Polyurethane)

A reaction vessel equipped with a stirrer, a reflux condenser, a thermometer, an air inlet tube and a material input port was prepared.

While the inside of the reaction vessel was replaced with air, 200.0 g of a polyhexamethylene carbonatediol (trade name "Duranol T6001", available from Asahi Kasei Chemicals Corp., the number average molecular weight by terminal functional group quantitative determination=1,000), 80.0 g of 1,4-butanediol and 120.0 g of a mixture (the hydroxyl value of 102.9 mgKOH/g) of dipentaerythritol pentaacrylate and pentaerythritol hexaacrylate were placed into the reaction vessel.

Then, 238.1 g of methyl ethyl ketone (MEK) as a solvent was placed thereinto. After the contents in the system were homogenized, 314.2 g of 4,4-methylenebis-cyclohexyldiisocyanate was placed thereinto at 50° C., dibutyltin laurylate was used as a catalyst, and the contents were allowed to undergo a reaction at 80° C. The viscosity of the reaction liquid was adjusted by dilution with the solvent, and the reaction was made to proceed until the disappearance of the absorption at 2,270 $cm^{-1}$ of the free isocyanate group measured by the infrared absorption spectral analysis is confirmed. Cyclohexanone was added until the mass ratio of MEK to cyclohexanone becomes 1:1 to obtain a resin solution containing polyurethane.

The viscosity of the resin solution obtained, the solid content thereof and the double bond equivalent were determined to be 200 dPa·s/20° C., 45% and 600 g/eq, respectively. Moreover, the weight average molecular weight of polyurethane measured by GPC was determined to be 44,000.

[Production Example of Laminated Film]

<Preparation of Base Material Film>

If a release layer is provided, a release layer is formed by applying a fluorine-based release agent on one side forming a coating film layer of the base material film to obtain a release layer.

<Emboss Processing of Base Material Film>

A film having a cubic pattern on the surface was formed by passing a film between a metallic emboss roll having a polygonal cubic pattern and a rubber roll opposing the metallic emboss roll while heating at 120° C. and applying a roll pressure.

<Preparation of Clear Coating Solution>

In a vessel equipped with a stirrer, a polyurethane acrylate (B1) and a monomer (B2) were placed, MEK in an amount that the final coating has a value of NV=40% was placed therein while stirring, furthermore, a polymerization initiator (B3) was placed therein, and the contents were stirred for 30 minutes to obtain a clear coating solution.

<Preparation of Coloring Coating Solution>

In a vessel equipped with a stirrer, a urethane resin (C1) and a luster material (C2) were placed, MIBK in an amount that the final coating has a value of NV=35% was placed therein while stirring, and the contents were stirred for 30 minutes to obtain a coloring coating solution.

<Preparation of Vapor-Deposited Aluminum-Containing Coating Solution>

In a vessel equipped with a stirrer, a binder resin (C1) and vapor-deposited aluminum (C2) were placed, MIBK in an amount that the final coating has a value of NV=2% was placed therein while stirring, and the contents were stirred for 30 minutes to obtain a vapor-deposited aluminum-containing coating solution.

<Preparation of Ultraviolet Ray-Absorbing Coating Solution>

In a vessel equipped with a stirrer, a binder resin (G1) and an ultraviolet ray absorber (G2) were placed, MEK in an amount that the final coating has a value of NV=40% was placed therein while stirring, and the contents were stirred for 30 minutes to obtain an ultraviolet ray-absorbing coating solution.

<Preparation 1 of Laminated Film>

On a base material film layer (A), the clear coating solution was applied by means of an applicator so that a clear coating film layer (B) with a film thickness after drying (hereinafter, dried film thickness) of 20 μm is obtained, and the film was dried for 15 minutes at 80° C. to form the clear coating film layer (B).

In this connection, hereinbelow, a film prepared by forming a clear coating film layer (B) above a base material film layer (A) is described as a (A+B) layer film.

Then, on the clear coating film layer (B) of the (A+B) layer film, the coloring coating solution was applied by means of an applicator so that a design layer (C) with a dried film thickness of 20 μm is obtained, after which the film was dried for 15 minutes at 80° C. to form a design layer (C).

Subsequently, on the design layer (C), an adhesive agent (VYLON UR-3200, available from TOYOBO CO., LTD.) was applied by means of an applicator so that an adhesion layer with a dried film thickness of 10 μm is obtained, and the film was dried for 15 minutes at 80° C. to form the adhesion layer.

<Preparation 2 of Laminated Film>

On a base material film layer (A), the clear coating solution was applied by means of an applicator so that a clear coating film layer (B) with a film thickness after drying (hereinafter, dried film thickness) of 20 μm is obtained, and the film was dried for 15 minutes at 80° C. to form the clear coating film layer (B).

In this connection, hereinbelow, a film prepared by forming a clear coating film layer (B) above a base material film layer (A) is described as a (A+B) layer film.

Then, on the clear coating film layer (B) of the (A+B) layer film, the vapor-deposited aluminum-containing coating solution was applied by means of a bar coater so that a metal design layer (C) with a prescribed dried film thickness is obtained, after which the film was dried for 15 minutes at 80° C. to form a metallic tone design layer (C).

Subsequently, on the metallic tone design layer (C), an adhesive agent (VYLON UR-3200, available from TOYOBO CO., LTD.) was applied by means of an applicator so that an adhesion layer with a dried film thickness of 10 μm is obtained, and the film was dried for 15 minutes at 80° C. to form the adhesion layer.

<Lamination of Protective Layer>

In the case of providing a protective layer, a prescribed binder solution was applied by means of an applicator so that a protective layer (F) with a film thickness after drying (hereinafter, dried film thickness) of 20 μm is obtained, after which the film was dried for 15 minutes at 80° C. to form the protective layer (F).

<Lamination of Ultraviolet Ray-Absorbing Layer>

In the case of providing an ultraviolet ray-absorbing layer, a prescribed binder solution was applied by means of an applicator so that an ultraviolet ray-absorbing layer (G) with a film thickness after drying (hereinafter, dried film thickness) of 20 μm is obtained, after which the film was dried for 15 minutes at 80° C. to form the ultraviolet ray-absorbing layer (G).

[Production Example of Formed Body Decorated with Laminated Film]

On a vertically ascending/descending table provided in a both-side vacuum forming apparatus (trade name NGF-0709, available from Fu-se Vacuum Forming Ltd.) composed of upper and lower boxes, an ABS-made base material (molded product) was mounted. Afterward, into a sheet clamping frame arranged above the molded base material (molded product) in the both-side vacuum forming apparatus, the laminated film obtained as above was fitted. Subsequently, the internal pressure was reduced so that the degree of vacuum in the upper and lower boxes becomes 1.0 kPa, the laminated film was heated by means of a near-infrared heater until the temperature of the laminated film becomes 90° C., and the molded base material was elevated to press-bond the molded base material and the laminated film, after which compressed air of 200 kPa was introduced into only the upper box and the state was kept for 35 seconds. The internal pressure of the upper and lower boxes was released to the atmosphere to obtain a decorated formed body decorated with the laminated film. Furthermore, the clear coating film layer (B) side of the decorated formed body was irradiated with ultraviolet rays of light quantity of 2000 mJ/cm$^2$ using a high-pressure mercury lamp of 120 W/cm, and the clear coating of the clear coating film layer (B) was cured to obtain a UV (ultraviolet ray) cured formed body.

In this connection, in the respective tables shown below, the following ingredients were used. Inkjet printing and laminating were performed under the following conditions.

UV 1700B (The Nippon Synthetic Chemical Industry Co., Ltd.); a urethane acrylate oligomer Lucirin TPO (BASF Japan Ltd.); 2,4,6-trimethylbenzoyl-diphenyl-phosphine oxide NOVACLEAR SG007 (Mitsubishi Plastics, Inc.) A-PET Sheet Lumirror-s-10 (TORAY Industries, INC): biaxially oriented polyester film ZK-93KM (Toray advanced film Co., Ltd.): nonoriented polypropylene film 3701J (Toray advanced film Co., Ltd.): nonoriented polypropylene film TE-5430 (Mitsui Chemicals, Inc.): a urethane resin Tinuvin 900 (BASF): 2,2-(2H-benzotriazole-2-il)-4,6-bis(1-methyl-1-phenylethyl)phenol Alpaste 65-388 aluminum (Toyo Aluminum K. K.): aluminum paste SOLBIN M5 (Nissin Chemical Industry Co., Ltd.): a vinyl chloride resin Metasheen 71-0010 (Ciba Specialty Chemicals): vapor-deposited aluminum UR-3200 (TOYOBO CO., LTD.): a polyester urethane resin R-298-1 Clear (NBC): clear coating for automobiles R-298 curing agent (NBC): curing agent for R-298-1 Clear Inkjet printing→Mimaki engineering Co., Ltd. UJF-3042

Laminate→MRK-650Y available from MCK CO., LTD., Heat-resistant silicone rubber covered roll with a diameter of 80 mm, Temperature: 85° C., Speed: 42 cm/min The laminated film obtained was evaluated according to the following criteria.

(Elongation)

The laminated film including the base material was measured at a tensile speed of 50 mm/min under the temperature condition of 80° C. using the Autograph AG-IS available from SHIMADZU CORPORATION.

At the point of time when any one of layers is broken, the elongation was judged.

(Film Strength)

As for the ultraviolet ray-absorbing layer alone, the film strength is measured by using Autograph AG-IS manufactured by Shimadzu corporation under the conditions that the temperature is 60° C., the tensile speed is 50 mm/min. and the elongation is 200%.

(Formability)

The both-side vacuum forming machine NGF-0709 available from Fu-se Vacuum Forming Ltd. was used to confirm the formability in the TOM forming.

⊙: Formable because even the highly-stretched portion of the laminated film follows the base material ◯: Formable because even the moderately stretched portion of the laminated film follows the base material Δ: Formable because the slightly stretched portion of the laminated film follows the base material ×: Unformable (Uneven Appearance)

A stretched portion after forming was visually evaluated.

⊙: Satisfactory in uneven shape retention because even the highly-stretched portion of the laminated film follows the base material ◯: Satisfactory in uneven shape retention because even the moderately stretched portion of the laminated film follows the base material Δ: Satisfactory in uneven shape retention because the slightly stretched portion of the laminated film follows the base material ×: Impossible to keep uneven shape (Metallic Appearance)

The stretched portion after forming was visually evaluated.

⊙: Satisfactory in metallic appearance because even the highly-stretched portion of the laminated film follows the base material ◯: Satisfactory in metallic appearance because even the moderately stretched portion of the laminated film follows the base material Δ: Satisfactory in metallic appearance because the slightly stretched portion of the laminated film follows the base material ×: A crack or white turbidity is observed (SW Resistance after Forming)

Using a steel wool resistance testing machine, a pad of steel wool of #0000 was made to move back and forth ten times while being applied with a load of 100 g/cm$^2$.

⊙: No scratches are observed

◯: Two or three linear scratches are observed

Δ: Countable linear scratches are observed

×: Countless linear scratches are observed (Impact Resistance after Forming)

Using a Dupont impact resistance testing machine, a weight of 500 g was dropped from a height of 20 cm to confirm the crack of the coating film.

⊙: No crack is observed

Δ: The coating film has a slight flaw

×: The coating film has a significant flaw (Chemical Resistance after Forming)

A cylindrical poly-ring with an inner diameter of 38 mm and a height of 15 mm was fixed on the surface of a coating film, the following solution was added dropwise, a lid was put on the opening, the liquid was allowed to settle under each condition, and the film after the test was washed with water to be compared with the initial state of the coating film.

Acid resistant test 0.1 N H2504 solution 5 ml 20° C.×24 h

Alkali resistant test 0.1 N NaOH solution 5 ml 55° C.×4 h

Water resistant test distilled water 5 ml 55° C.×4 h

⊙: There is no change in the coating film

◯: There is a slight change in the appearance of the coating film (wrinkles, cracks)

Δ: There is an appreciable change in the appearance of the coating film (wrinkles, cracks)

×: There is a significant change in the appearance of the coating film (wrinkles, cracks)

TABLE 1

| | | | Example No. | | | | | |
|---|---|---|---|---|---|---|---|---|
| | | | 1 | 2 | 3 | 4 | 5 | 6 |
| Base material film layer (A) | Kind | | SG007 | ZK-93KM | 3701J | SG007 | ZK-93KM | 3701J |
| | Thickness | | 220 μm | 100 μm | 100 μm | 220 μm | 100 μm | 100 μm |
| | Uneven design | | Cubic pattern | Mat large | Mat small | cubic pattern | Mat large | Mat small |
| Clear coating film layer (B) | Component B1 | Double bond equivalent | 600 | 600 | 600 | 600 | 600 | 600 |
| | | Urethane equivalent | 1500 | 1500 | 1500 | 1500 | 1500 | 1500 |
| | | Mw | 44000 | 44000 | 44000 | 44000 | 44000 | 44000 |

TABLE 1-continued

|  |  |  | Example No. | | | | | |
| --- | --- | --- | --- | --- | --- | --- | --- | --- |
|  |  |  | 1 | 2 | 3 | 4 | 5 | 6 |
|  | Component B2 | Monomer/Oligomer |  | UV1700B | | | UV1700B | |
|  | Component B3 | Polymerization initiator |  | Lucirin TPO | | | Lucirin TPO | |
|  | Blending amount | B1 | 90 | 90 | 90 | 90 | 90 | 90 |
|  |  | B2 | 10 | 10 | 10 | 10 | 10 | 10 |
|  |  | B3 | 5 | 5 | 5 | 5 | 5 | 5 |
|  | Drying temperature |  |  | 80° C. | | | 80° C. | |
|  | Drying time |  |  | 15 minutes | | | 15 minutes | |
|  | Dried film thickness |  |  | 20 μm | | | 20 μm | |
| Design layer (C) | Component C1 | Molecular weight Mw |  | 50000 | | | 50000 | |
|  |  | Tg |  | −20° C. | | | −20° C. | |
|  | Component C2 | Luster agent |  | 65-388 aluminum | | | 65-388 aluminum | |
|  | Blending amount | C1 | 85 | 85 | 85 | 85 | 85 | 85 |
|  |  | C2 | 15 | 15 | 15 | 15 | 15 | 15 |
|  | Drying temperature |  |  | 80° C. | | | 80° C. | |
|  | Drying time |  |  | 15 minutes | | | 15 minutes | |
|  | Dried film thickness |  |  | 20 μm | | | 20 μm | |
|  | Release layer (D) |  | Presence | Absence | Absence | Presence | Absence | Absence |
| Adhesion layer (E) | Kind |  |  | UR-3200 | | | Absence | |
|  | Drying temperature |  |  | 80° C. | | | — | |
|  | Drying time |  |  | 15 minutes | | | — | |
|  | Dried film thickness |  |  | 20 μm | | | — | |
|  | Film constitution |  |  | FIG. 1 | | | FIG. 2 | |
|  | Base material |  |  | ABS | | | ABS | |
| Characteristics | Before forming | Elongation | ◯ | ◯ | ◯ | ◯ | ◯ | ◯ |
|  |  | Formability | ◯ | ◯ | ◯ | ◯ | ◯ | ◯ |
|  | After forming | Uneven appearance | ◯ | ◯ | ◯ | ◯ | ◯ | ◯ |
|  |  | SW resistance | ◯ | ◯ | ◯ | ◯ | ◯ | ◯ |
|  |  | Impact resistance | ◯ | ◯ | ◯ | ◯ | ◯ | ◯ |
|  |  | Chemical resistance | ◯ | ◯ | ◯ | ◯ | ◯ | ◯ |

TABLE 2

|  |  |  | Example No. | | |
| --- | --- | --- | --- | --- | --- |
|  |  |  | 7 | 8 | 9 |
| Base material film layer (A) | Kind | | SG007 | ZK-93KM | 3701J |
|  | Thickness | | 220 μm | 100 μm | 100 μm |
|  | Uneven design | | Cubic pattern | Mat large | Mat small |
| Clear coating film layer (B) | Component B1 | Double bond equivalent | 600 | 600 | 600 |
|  |  | Urethane equivalent | 1500 | 1500 | 1500 |
|  |  | Mw | 44000 | 44000 | 44000 |
|  | Component B2 | Monomer/Oligomer |  | UV1700B | |
|  | Component B3 | Polymerization initiator |  | Lucirin TPO | |
|  | Blending amount | B1 | 90 | 90 | 90 |
|  |  | B2 | 10 | 10 | 10 |
|  |  | B3 | 5 | 5 | 5 |
|  | Drying temperature | |  | 80° C. | |
|  | Drying time | |  | 15 minutes | |
|  | Dried film thickness | |  | 20 μm | |
| Metallic tone design layer (C) | component C1 | Binder |  | SOLBIN M5 | |
|  | component C2 | Vapor-deposited aluminum |  | Metasheen 71-0010 | |

TABLE 2-continued

|  |  |  | Example No. | | |
| --- | --- | --- | --- | --- | --- |
|  |  |  | 7 | 8 | 9 |
|  | Blending amount | C1 | 50 | 50 | 50 |
|  |  | C2 | 50 | 50 | 50 |
|  | Drying temperature | | 80° C. | | |
|  | Drying time | | 15 minutes | | |
|  | Dried film thickness | | 0.15 μm | 0.15 μm | 0.15 μm |
|  | Release layer (D) | | Presence | Absence | Absence |
| Adhesion layer (E) | Kind | | UR-3200 | | |
|  | Drying temperature | | 80° C. | | |
|  | Drying time | | 15 minutes | | |
|  | Dried film thickness | | 20 μm | | |
|  | Film constitution | | FIG. 1 | | |
|  | Base material | | ABS | | |
| Characteristics | Before forming | Elongation | ○ | ○ | ○ |
|  |  | Formability | ○ | ○ | ○ |
|  | After forming | Uneven appearance | ○ | ○ | ○ |
|  |  | Metallic appearance | ○ | ○ | ○ |
|  |  | SW resistance | ○ | ○ | ○ |
|  |  | Impact resistance | ○ | ○ | ○ |
|  |  | Chemical resistance | ○ | ○ | ○ |

TABLE 3

|  |  |  | Example No. | | |
| --- | --- | --- | --- | --- | --- |
|  |  |  | 10 | 11 | 12 |
| Base material film layer (A) | Kind | | SG007 | ZK-93KM | 3701J |
|  | Thickness | | 220 μm | 100 μm | 100 μm |
|  | Uneven design | | Cubic pattern | Mat large | Mat small |
| Clear coating film layer (B) | Component B1 | Double bond equivalent | 600 | 600 | 600 |
|  |  | Urethane equivalent | 1500 | 1500 | 1500 |
|  |  | Mw | 44000 | 44000 | 44000 |
|  | Component B2 | Monomer/Oligomer | UV1700B | | |
|  | Component B3 | Polymerization initiator | Lucirin TPO | | |
|  | Blending amount | B1 | 90 | 90 | 90 |
|  |  | B2 | 10 | 10 | 10 |
|  |  | B3 | 5 | 5 | 5 |
|  | Drying temperature | | 80° C. | | |
|  | Drying time | | 15 minutes | | |
|  | Dried film thickness | | 20 μm | | |
| Protective layer (F) | Component F | Binder | TE-5430 | | |
|  | Drying temperature | | 80° C. | | |
|  | Drying time | | 15 minutes | | |
|  | Dried film thickness | | 20 μm | | |
| Metallic tone design layer (C) | component C1 | Binder | SOLBIN M5 | | |
|  | component C2 | Vapor-deposited aluminum | Metasheen 71-0010 | | |
|  | Blending amount | C1 | 50 | 50 | 50 |
|  |  | C2 | 50 | 50 | 50 |
|  | Drying temperature | | 80° C. | | |
|  | Drying time | | 15 minutes | | |
|  | Dried film thickness | | 0.15 μm | 0.15 μm | 0.15 μm |
|  | Release layer (D) | | Presence | Absence | Absence |
| Adhesion layer (E) | Kind | | UR-3200 | | |
|  | Drying temperature | | 80° C. | | |
|  | Drying time | | 15 minutes | | |
|  | Dried film thickness | | 20 μm | | |
|  | Film constitution | | FIG. 3 | | |
|  | Base material | | ABS | | |
| Characteristics | Before forming | Elongation | ○ | ○ | ○ |
|  |  | Formability | ○ | ○ | ○ |

TABLE 3-continued

|  |  | Example No. |  |  |
|---|---|---|---|---|
|  |  | 10 | 11 | 12 |
| After forming | Uneven appearance | ○ | ○ | ○ |
|  | Metallic appearance | ⊚ | ⊚ | ⊚ |
|  | SW resistance | ○ | ○ | ○ |
|  | Impact resistance | ○ | ○ | ○ |
|  | Chemical resistance | ○ | ○ | ○ |

TABLE 4

|  |  |  | Example No. |  |  |
|---|---|---|---|---|---|
|  |  |  | 13 | 14 | 15 |
| Base material film layer (A) |  | Kind | SG007 | ZK-93KM | 3701J |
|  |  | Thickness | 220 μm | 100 μm | 100 μm |
|  |  | Uneven design | Cubic pattern | Mat large | Mat small |
| Clear coating film layer (B) | Component B1 | Double bond equivalent | 600 | 600 | 600 |
|  |  | Urethane equivalent | 1500 | 1500 | 1500 |
|  |  | Mw | 44000 | 44000 | 44000 |
|  | Component B2 | Monomer/Oligomer | UV1700B | | |
|  | Component B3 | Polymerization initiator | Lucirin TPO | | |
|  | Blending amount | B1 | 90 | 90 | 90 |
|  |  | B2 | 10 | 10 | 10 |
|  |  | B3 | 5 | 5 | 5 |
|  | Drying temperature |  | 80° C. | | |
|  | Drying time |  | 15 minutes | | |
|  | Dried film thickness |  | 20 μm | | |
| Metallic tone design layer (C) | Vapor-deposited layer | Vapor-deposited metal | Indium | | |
|  |  | Vapor-deposited thickness | 0.60 μm | | |
|  | Release layer (D) |  | Presence | Absence | Absence |
| Adhesion layer (E) | Kind |  | UR-3200 | | |
|  | Drying temperature |  | 80° C. | | |
|  | Drying time |  | 15 minutes | | |
|  | Dried film thickness |  | 20 μm | | |
|  | Film constitution |  | FIG. 1 | | |
|  | Base material |  | ABS | | |
| Characteristics | Before forming | Elongation | ○ | ○ | ○ |
|  |  | Formability | ○ | ○ | ○ |
|  | After forming | Uneven appearance | ○ | ○ | ○ |
|  |  | Metallic appearance | ○Δ | ○ | ○ |
|  |  | SW resistance | ○ | ○ | ○ |
|  |  | Impact resistance | ○ | ○ | ○ |
|  |  | Chemical resistance | ○ | ○ | ○ |

TABLE 5

| | | | Example No. 16 | Example No. 17 | Example No. 18 |
|---|---|---|---|---|---|
| Base material film layer (A) | | Kind | SG007 | ZK-93KM | 3701J |
| | | Thickness | 220 μm | 100 μm | 100 μm |
| | | Uneven design | Cubic pattern | Mat large | Mat small |
| Clear coating film layer (B) | Component B1 | Double bond equivalent | 600 | 600 | 600 |
| | | Urethane equivalent | 1500 | 1500 | 1500 |
| | | Mw | 44000 | 44000 | 44000 |
| | Component B2 | Monomer/ Oligomer | | UV1700B | |
| | Component B3 | Polymerization initiator | | Lucirin TPO | |
| | Blending amount | B1 | 90 | 90 | 90 |
| | | B2 | 10 | 10 | 10 |
| | | B3 | 5 | 5 | 5 |
| | Drying temperature | | | 80° C. | |
| | Drying time | | | 15 minutes | |
| | Dried film thickness | | | 20 μm | |
| Protective layer (F) | Component F | Binder | | TE-5430 | |
| | Drying temperature | | | 80° C. | |
| | Drying time | | | 15 minutes | |
| | Dried film thickness | | | 20 μm | |
| Metallic tone design layer (C) | Vapor-deposited layer | Vapor-deposited metal | | Indium | |
| | | Vapor-deposited thickness | | 0.6 μm | |
| | Release layer (D) | | Presence | Absence | Absence |
| Adhesion layer (E) | | Kind | | UR-3200 | |
| | Drying temperature | | | 80° C. | |
| | Drying time | | | 15 minutes | |
| | Dried film thickness | | | 20 μm | |
| | Film constitution | | | FIG. 3 | |
| | Base material | | | ABS | |
| Characteristics | Before forming | Elongation | ○ | ○ | ○ |
| | | Formability | ○ | ○ | ○ |
| | After forming | Uneven appearance | ○ | ○ | ○ |
| | | Metallic appearance | ◎ | ◎ | ◎ |
| | | SW resistance | ○ | ○ | ○ |
| | | Impact resistance | ○ | ○ | ○ |
| | | Chemical resistance | ○ | ○ | ○ |

TABLE 6

| | | | Example No. | | |
|---|---|---|---|---|---|
| | | | 19 | 20 | 21 |
| Base material film layer (A) | | Kind | SG007 | ZK-93KM | 3701J |
| | | Thickness | 220 μm | 100 μm | 100 μm |
| | | Uneven design | Cubic pattern | Mat large | Mat small |
| Clear coating film layer (B) | Component B1 | Double bond equivalent | 600 | 600 | 600 |
| | | Urethane equivalent | 1500 | 1500 | 1500 |
| | | Mw | 44000 | 44000 | 44000 |
| | Component B2 | Monomer/Oligomer | | UV1700B | |
| | Component B3 | Polymerization initiator | | Lucirin TPO | |
| | Blending amount | B1 | 90 | 90 | 90 |
| | | B2 | 10 | 10 | 10 |
| | | B3 | 5 | 5 | 5 |
| | | Drying temperature | | 80° C. | |
| | | Drying time | | 15 minutes | |
| | | Dried film thickness | | 20 μm | |
| Ultraviolet ray-absorbing layer (G) | Component G1 | Binder | | TE-5430 | |
| | Component G2 | UV absorber | | Tinuvin 900 | |
| | Blending amount | G1 | 94 | 94 | 94 |
| | | G2 | 6 | 6 | 6 |
| | | Drying temperature | | 80° C. | |
| | | Drying time | | 15 minutes | |
| | | Dried film thickness | | 20 μm | |
| | Design layer (C) | | | Inkjet printing | |
| | Release layer (D) | | Presence | Absence | Absence |
| Adhesion layer (E) | | Kind | | UR-3200 | |
| | | Drying temperature | | 80° C. | |
| | | Drying time | | 15 minutes | |
| | | Dried film thickness | | 20 μm | |
| | Film constitution | | | FIG. 4 | |
| | Base material | | | ABS | |
| Characteristics | Before forming | Elongation | ○ | ○ | ○ |
| | | Surface tension | 37.8 | 32.9 | 45.4 |
| | | Ultraviolet transmittance | 0.20% | 0.20% | 0.20% |
| | | Film strength | 104.2 | 178.3 | 59.5 |
| | | Formability | ○ | ○ | ○ |
| | | Printing aptitude | ○△ | ○△ | ○ |
| | After forming | Uneven appearance | ○ | ○ | ○ |
| | | SW resistance | ○ | ○ | ○ |
| | | Impact resistance | ○ | ○ | ○ |
| | | Chemical resistance | ○ | ○ | ○ |

TABLE 7

| | | | Example No. | | |
|---|---|---|---|---|---|
| | | | 22 | 23 | 24 |
| Base material film layer (A) | | Kind | SG007 | ZK-93KM | 3701J |
| | | Thickness | 220 μm | 100 μm | 100 μm |
| | | Uneven design | Cubic pattern | Mat large | Mat small |
| Clear coating film layer (B) | Component B1 | Double bond equivalent | 600 | 600 | 600 |
| | | Urethane equivalent | 1500 | 1500 | 1500 |
| | | Mw | 44000 | 44000 | 44000 |
| | Component B2 | Monomer/Oligomer | | UV1700B | |
| | Component B3 | Polymerization initiator | | Lucirin TPO | |
| | Blending amount | B1 | 90 | 90 | 90 |
| | | B2 | 10 | 10 | 10 |
| | | B3 | 5 | 5 | 5 |

TABLE 7-continued

| | | | Example No. | | |
|---|---|---|---|---|---|
| | | | 22 | 23 | 24 |
| | | Drying temperature | 80° C. | | |
| | | Drying time | 15 minutes | | |
| | | Dried film thickness | 20 µm | | |
| Ultraviolet ray-absorbing layer (G) | Component G1 | Binder | TE-5430 | | |
| | Component G2 | UV absorber | Tinuvin 900 | | |
| | Blending amount | G1 | 94 | 94 | 94 |
| | | G2 | 6 | 6 | 6 |
| | | Drying temperature | 80° C. | | |
| | | Drying time | 15 minutes | | |
| | | Dried film thickness | 20 µm | | |
| | Inkjet layer | | Inkjet printing | | |
| Protective layer (F) | Component F | Binder | TE-5430 | | |
| | | Drying temperature | 80° C. | | |
| | | Drying time | 15 minutes | | |
| | | Dried film thickness | 20 µm | | |
| Metallic tone design layer (C) | component C1 | Binder | SOLBIN M5 | | |
| | component C2 | Vapor-deposited aluminum | Metasheen 71-0010 | | |
| | Blending amount | C1 | 50 | 50 | 50 |
| | | C2 | 50 | 50 | 50 |
| | | Drying temperature | 80° C. | | |
| | | Drying time | 15 minutes | | |
| | | Dried film thickness | 0.15 µm | 0.15 µm | 0.15 µm |
| | Release layer (D) | | Presence | Absence | Absence |
| Adhesion layer (E) | | Kind | UR-3200 | | |
| | | Drying temperature | 80° C. | | |
| | | Drying time | 15 minutes | | |
| | | Dried film thickness | 20 µm | | |
| | Film constitution | | FIG. 5 | | |
| | Base material | | ABS | | |
| Characteristics | Before forming | Elongation | ○ | ○ | ○ |
| | | Formability | ○ | ○ | ○ |
| | After forming | Uneven appearance | ○ | ○ | ○ |
| | | Printing appearance | ○ | ○ | ○ |
| | | Metallic appearance | ◎ | ◎ | ◎ |
| | | SW resistance | ○ | ○ | ○ |
| | | Impact resistance | ○ | ○ | ○ |
| | | Chemical resistance | ○ | ○ | ○ |

TABLE 8

| | | | Example No. | | |
|---|---|---|---|---|---|
| | | | 25 | 26 | 27 |
| Base material film layer (A) | | Kind | SG007 | ZK-93KM | 3701J |
| | | Thickness | 220 µm | 100 µm | 100 µm |
| | | Uneven design | Cubic pattern | Mat large | Mat small |
| Clear coating film layer (B) | Component B1 | Double bond equivalent | 600 | 600 | 600 |
| | | Urethane equivalent | 1500 | 1500 | 1500 |
| | | Mw | 44000 | 44000 | 44000 |
| | Component B2 | Monomer/Oligomer | UV1700B | | |
| | Component B3 | Polymerization initiator | Lucirin TPO | | |
| | Blending amount | B1 | 90 | 90 | 90 |
| | | B2 | 10 | 10 | 10 |
| | | B3 | 5 | 5 | 5 |
| | | Drying temperature | 80° C. | | |
| | | Drying time | 15 minutes | | |
| | | Dried film thickness | 20 µm | | |
| Ultraviolet ray-absorbing layer (G) | Component G1 | Binder | TE-5430 | | |
| | Component G2 | UV absorber | Tinuvin 900 | | |
| | Blending amount | G1 | 94 | 94 | 94 |
| | | G2 | 6 | 6 | 6 |
| | | Drying temperature | 80° C. | | |
| | | Drying time | 15 minutes | | |
| | | Dried film thickness | 20 µm | | |
| | Inkjet layer | | Inkjet printing | | |

TABLE 8-continued

|  |  |  | Example No. | | |
|---|---|---|---|---|---|
|  |  |  | 25 | 26 | 27 |
| Protective layer (F) | Component F | Binder | TE-5430 | | |
|  |  | Drying temperature | 80° C. | | |
|  |  | Drying time | 15 minutes | | |
|  |  | Dried film thickness | 20 μm | | |
| Metallic tone design layer (C) | Vapor-deposited layer | Vapor-deposited metal | Indium | | |
|  |  | Vapor-deposited thickness | 0.60 μm | 0.60 μm | 0.60 μm |
|  | Release layer (D) |  | Presence | Absence | Absence |
| Adhesion layer (E) |  | Kind | UR-3200 | | |
|  |  | Drying temperature | 80° C. | | |
|  |  | Drying time | 15 minutes | | |
|  |  | Dried film thickness | 20 μm | | |
|  | Film constitution |  | FIG. 5 | | |
|  | Base material |  | ABS | | |
| Characteristics | Before forming | Elongation | ○ | ○ | ○ |
|  |  | Formability | ○ | ○ | ○ |
|  | After forming | Uneven appearance | ○ | ○ | ○ |
|  |  | Printing appearance | ○ | ○ | ○ |
|  |  | Metallic appearance | ⊚ | ⊚ | ⊚ |
|  |  | SW resistance | ○ | ○ | ○ |
|  |  | Impact resistance | ○ | ○ | ○ |
|  |  | Chemical resistance | ○ | ○ | ○ |

TABLE 9

|  |  |  | Comparative example No. | | |
|---|---|---|---|---|---|
|  |  |  | 6 | 7 | 8 |
| Base material film layer (A) |  | Kind | S-10 | ZK-93KM | ZK-93KM |
|  |  | Thickness | 100 μm | 100 μm | 100 μm |
|  |  | Uneven design | Cubic pattern | Mat large | Mat large |
| Clear coating film layer (B) | Component B1 | Double bond equivalent | 600 | R-298-1 | R-298-1 |
|  |  | Urethane equivalent | 1500 | Clear | Clear |
|  |  | Mw | 44000 |  | R-298 |
|  | Component B2 | Monomer/Oligomer | UV1700B |  | Curing |
|  | Component B3 | Polymerization initiator | Lucirin TPO |  | agent |
|  | Blending amount | B1 | 90 | | |
|  |  | B2 | 10 | | |
|  |  | B3 | 5 | | |
|  |  | Drying temperature | 80° C. | | |
|  |  | Drying time | 15 minutes | | |
|  |  | Dried film thickness | 20 μm | | |
| Design layer (C) | Component C1 | Molecular weight Mw | 50000 | | |
|  |  | Tg | −20° C. | | |
|  | Component C2 | Luster agent | 65-388 aluminum | | |
|  | Blending amount | C1 | 85 | 85 | 85 |
|  |  | C2 | 15 | 15 | 15 |
|  |  | Drying temperature | 80° C. | | |
|  |  | Drying time | 15 minutes | | |
|  |  | Dried film thickness | 20 μm | | |
|  | Release layer (D) |  | Presence | Absence | Absence |
| Adhesion layer (E) |  | Kind | UR-3200 | | |
|  |  | Drying temperature | 80° C. | | |
|  |  | Drying time | 15 minutes | | |
|  |  | Dried film thickness | 20 μm | | |
|  | Film constitution |  | FIG. 1 | | |
|  | Base material |  | ABS | | |
| Characteristics | Before forming | Elongation | X | ○ | X |
|  |  | Formability | X | ○ | X |
|  | After forming | Uneven appearance | X | Δ | X |
|  |  | SW resistance | ○ | X | ○ |
|  |  | Impact resistance | ○ | ○ | ○ |
|  |  | Chemical resistance | ○ | X | ○ |

From the results of the foregoing examples, it is obvious that a three-dimensional molded product can be decorated properly by using the laminated film for decorating a three-dimensional molded product according to the present disclosure, because the laminated film has a good formability and a superior properties of decorated surface and provides sufficiently a three-dimensional design property due to the uneven design.

INDUSTRIAL APPLICABILITY

The laminated film for decorating a three-dimensional molded product by vacuum forming according to the present disclosure can be suitably used at the time of subjecting various molded bodies to decorating having a three-dimensional shape.

REFERENCE SIGN LIST (A): Base material film layer
(B): Clear coating film layer
(C): Design layer
(D): Release layer
(E): Adhesion layer
(F): Protective layer
(G): Ultraviolet ray-absorbing layer
(H): Inkjet layer

The invention claimed is:

1. A laminated film for decorating a three-dimensional molded product by vacuum forming, comprising:
a base material film layer (A), a clear coating film layer (B), and a design layer (C), wherein at least one face of the base material film layer (A) bordering the clear coating film layer (B) has an uneven design;
wherein the clear coating film layer (B) is a layer formed from an active energy ray-curing type coating composition containing a polyurethane acrylate (B1); and
wherein physical properties of the polyurethane acrylate (B1) are:
a double bond equivalent of from 130 to 600 g/eq;
a weight average molecular weight of from 3000 to 200,000; and
a urethane concentration of from 300 to 2000 g/eq.

2. The laminated film according to claim 1, comprising a breaking elongation of 30 to 400% at 40 to 130° C. before being cured.

3. The laminated film according to claim 1, wherein the clear coating film layer (B) is formed from an active energy ray-curing type coating composition containing a polyurethane acrylate (B1), a monomer/oligomer (B2) having an unsaturated double bond and a polymerization initiator (B3), and
the active energy ray-curing type coating composition contains the (B1) 50 to 99 wt parts, and (B2) 1 to 50 wt parts relative to total amount of solid matter weight of (B1) and solid matter weight of (B2) being ((B1)+(B2)) 100 wt parts, and (B3) 0.5 to 20 wt parts relative to total amount of solid matter weight of (B1) and solid matter weight of (B2) being ((B1)+(B2)) 100 wt parts.

4. The laminated film according to claim 2, wherein the clear coating film layer (B) is formed from an active energy ray-curing type coating composition containing a polyurethane acrylate (B1), a monomer/oligomer (B2) having an unsaturated double bond and a polymerization initiator (B3), and the active energy ray-curing type coating composition contains the (B1) 50 to 99 wt parts, and (B2) 1 to 50 wt parts relative to total amount of solid matter weight of (B1) and solid matter weight of (B2) being ((B1)+(B2)) 100 wt parts, and (B3) 0.5 to 20 wt parts relative to total amount of solid matter weight of (B1) and solid matter weight of (B2) being ((B1)+(B2)) 100 wt parts.

5. The laminated film according to claim 1, which is a film prepared by laminating a base material film layer (A), a clear coating film layer (B), and a design layer (C) in this order.

6. The laminated film according to claim 2, which is a film prepared by laminating a base material film layer (A), a clear coating film layer (B), and a design layer (C) in this order.

7. The laminated film according to claim 3, which is a film prepared by laminating a base material film layer (A), a clear coating film layer (B), and a design layer (C) in this order.

8. The laminated film according to claim 4, which is a film prepared by laminating a base material film layer (A), a clear coating film layer (B), and a design layer (C) in this order.

9. The laminated film according to claim 1, further comprising an adhesion layer (E) on the outer side of the design layer (C).

10. The laminated film according to claim 2, further comprising an adhesion layer (E) on the outer side of the design layer (C).

11. The laminated film according to claim 3, further comprising an adhesion layer (E) on the outer side of the design layer (C).

12. The laminated film according to claim 4, further comprising an adhesion layer (E) on the outer side of the design layer (C).

13. The laminated film according to claim 5, further comprising an adhesion layer (E) on the outer side of the design layer (C).

14. The laminated film according to claim 6, further comprising an adhesion layer (E) on the outer side of the design layer (C).

15. The laminated film according to claim 7, further comprising an adhesion layer (E) on the outer side of the design layer (C).

16. The laminated film according to claim 8, further comprising an adhesion layer (E) on the outer side of the design layer (C).

17. The laminated film according to claim 9, wherein the adhesion layer (E) is formed by applying or laminating.

18. A method for producing the laminated film according to claim 1, the method comprising:
a step (1) of forming a clear coating film layer (B) on a face having an uneven design of a base material film layer (A) having at least one face with an uneven design; and
a step (2) of forming a design layer (C).

19. The method according to claim 18, further comprising a step of forming an adhesion layer (E) on the design layer (C).

20. A method for decorating a three-dimensional molded product, which comprises adhering the adhesion layer of the laminated film according to claim 1, to a three-dimensional molded product under a heating condition.

* * * * *